US012593274B2

(12) United States Patent     (10) Patent No.:   US 12,593,274 B2

Abotabl et al.     (45) Date of Patent:    Mar. 31, 2026

(54) SWITCHING BANDWIDTH PARTS (BWPS) BASED ON ENERGY SAVINGS MODES

(71) Applicant: QUALCOMM Incorporated, San Diego, CA (US)

(72) Inventors: Ahmed Attia Abotabl, San Diego, CA (US); Hung Dinh Ly, San Diego, CA (US); Yongjun Kwak, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1008 days.

(21) Appl. No.: 17/653,867

(22) Filed: Mar. 7, 2022

(65) Prior Publication Data

US 2023/0284135 A1     Sep. 7, 2023

(51) Int. Cl.
| | |
|---|---|
| *H04W 52/02* | (2009.01) |
| *H04L 1/00* | (2006.01) |
| *H04W 72/044* | (2023.01) |
| *H04W 72/1263* | (2023.01) |

(52) U.S. Cl.
CPC ....... *H04W 52/0216* (2013.01); *H04L 1/0025* (2013.01); *H04W 72/044* (2013.01); *H04W 72/1263* (2013.01)

(58) Field of Classification Search
CPC .......... H04W 52/0216; H04W 72/044; H04W 72/1263; H04W 52/0235; H04L 1/0025; Y02D 30/70
See application file for complete search history.

(56) References Cited

U.S. PATENT DOCUMENTS

| | | | | |
|---|---|---|---|---|
| 2018/0014322 | A1* | 1/2018 | Loehr | H04W 28/0278 |
| 2018/0343616 | A1* | 11/2018 | Karsi | H04W 52/0235 |
| 2019/0313332 | A1 | 10/2019 | Wu et al. | |
| 2021/0037484 | A1 | 2/2021 | Zhou et al. | |
| 2021/0045147 | A1* | 2/2021 | Zhou | H04L 5/0098 |
| 2021/0144644 | A1 | 5/2021 | Hsieh et al. | |

(Continued)

FOREIGN PATENT DOCUMENTS

| | | |
|---|---|---|
| EP | 3513511 A1 | 7/2019 |
| EP | 3982672 A1 | 4/2022 |

(Continued)

OTHER PUBLICATIONS

Partial International Search Report—PCT/US2023/062190—ISA/EPO—May 31, 2023.

(Continued)

*Primary Examiner* — Ian N Moore
*Assistant Examiner* — Latresa A McCallum
(74) *Attorney, Agent, or Firm* — Arent Fox, LLP

(57) ABSTRACT

In certain aspects, a base station or network node is configured with multiple energy saving (ES) modes to reduce the amount of power/energy used by the network node and/or a user equipment (UE). In certain aspects, the network node may provide the UE with an indication of the multiple ES modes as well as a mapping between each of the ES modes and one or more communication parameters (e.g., scheduling request (SR) parameters and/or bandwidth part (BWP) parameters) so that the UE may communicate with the network node in a manner consistent with an ES mode.

30 Claims, 14 Drawing Sheets

(56)                  References Cited

U.S. PATENT DOCUMENTS

| 2021/0250920 | A1* | 8/2021 | Kim | .................. | H04W 72/0453 |
| 2021/0360532 | A1* | 11/2021 | Jiang | ..................... | H04W 76/28 |
| 2022/0022201 | A1* | 1/2022 | Mellqvist | ............. | H04W 76/15 |
| 2022/0078822 | A1* | 3/2022 | Myung | ............ | H04W 72/0453 |

FOREIGN PATENT DOCUMENTS

| WO | 2019095765 | A1 | 5/2019 |
| WO | 2020259654 | A1 | 12/2020 |

OTHER PUBLICATIONS

International Search Report and Written Opinion—PCT/US2023/062190—ISA/EPO—Aug. 16, 2023.

\* cited by examiner

1000

1050

1100

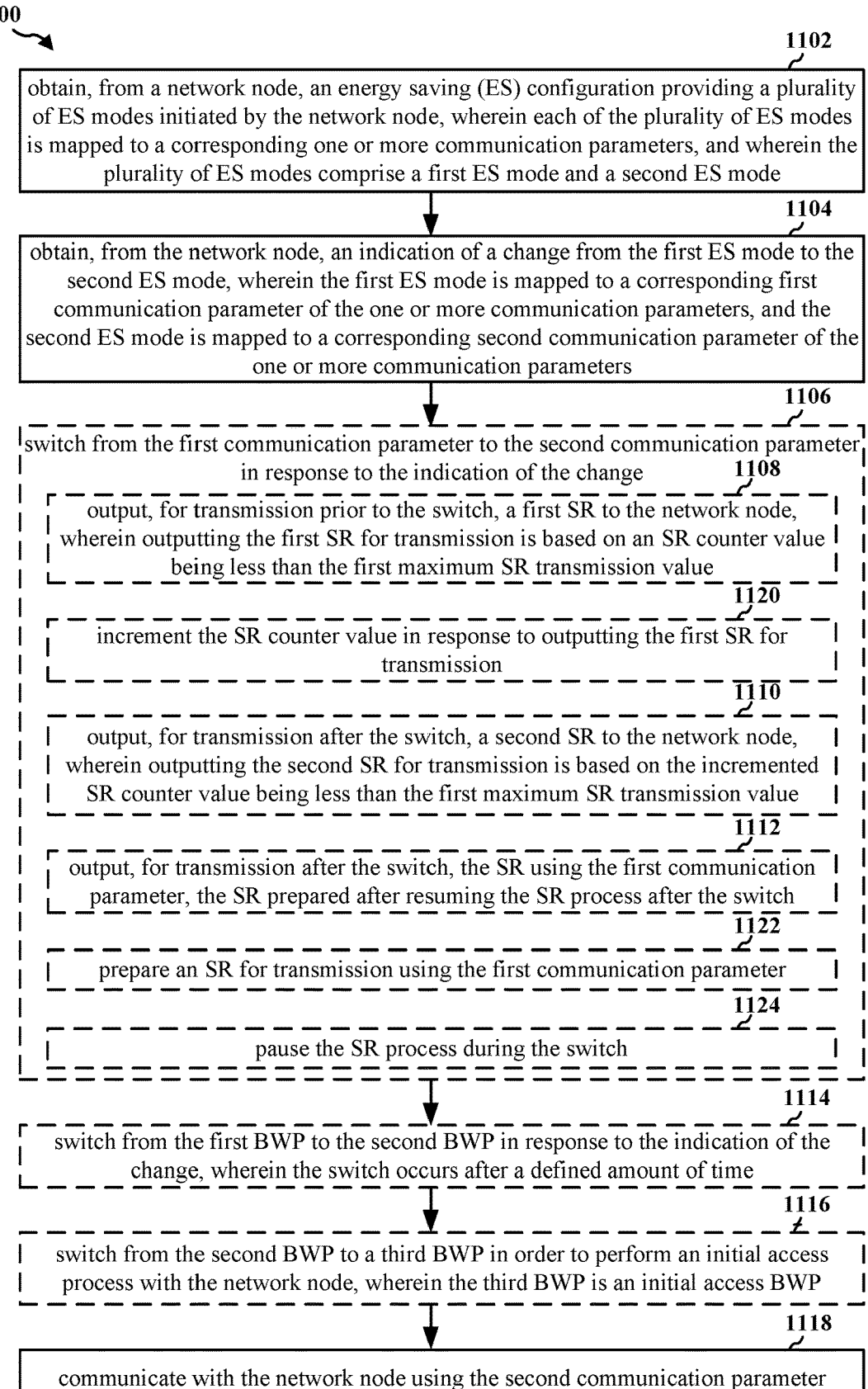

1102 obtain, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode

1104 obtain, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters

1106 switch from the first communication parameter to the second communication parameter, in response to the indication of the change          1108 output, for transmission prior to the switch, a first SR to the network node, wherein outputting the first SR for transmission is based on an SR counter value being less than the first maximum SR transmission value

1120 increment the SR counter value in response to outputting the first SR for transmission

1110 output, for transmission after the switch, a second SR to the network node, wherein outputting the second SR for transmission is based on the incremented SR counter value being less than the first maximum SR transmission value

1112 output, for transmission after the switch, the SR using the first communication parameter, the SR prepared after resuming the SR process after the switch

1122 prepare an SR for transmission using the first communication parameter

1124 pause the SR process during the switch

1114 switch from the first BWP to the second BWP in response to the indication of the change, wherein the switch occurs after a defined amount of time

1116 switch from the second BWP to a third BWP in order to perform an initial access process with the network node, wherein the third BWP is an initial access BWP

1118 communicate with the network node using the second communication parameter

1302 output, for transmission to a user equipment (UE), an energy saving (ES) configuration providing a plurality of ES modes used by the apparatus, wherein each of the plurality of ES modes is mapped to a corresponding one or more communication parameters, and wherein the plurality of ES modes comprises a first ES mode and a second ES mode

1304 output, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters

1306 switch from the first ES mode to the second ES mode

1308 obtain, from the UE after the switch, an SR configured according to one of the first maximum SR transmission value or the second maximum SR transmission value

1310 switch from the first BWP to the second BWP after a configured amount of time following the output for transmission of the indication of the change

1312 communicate with the UE according to the second communication parameter

1314 communicate with the UE according to the second BWP after the switch

FIG. 13

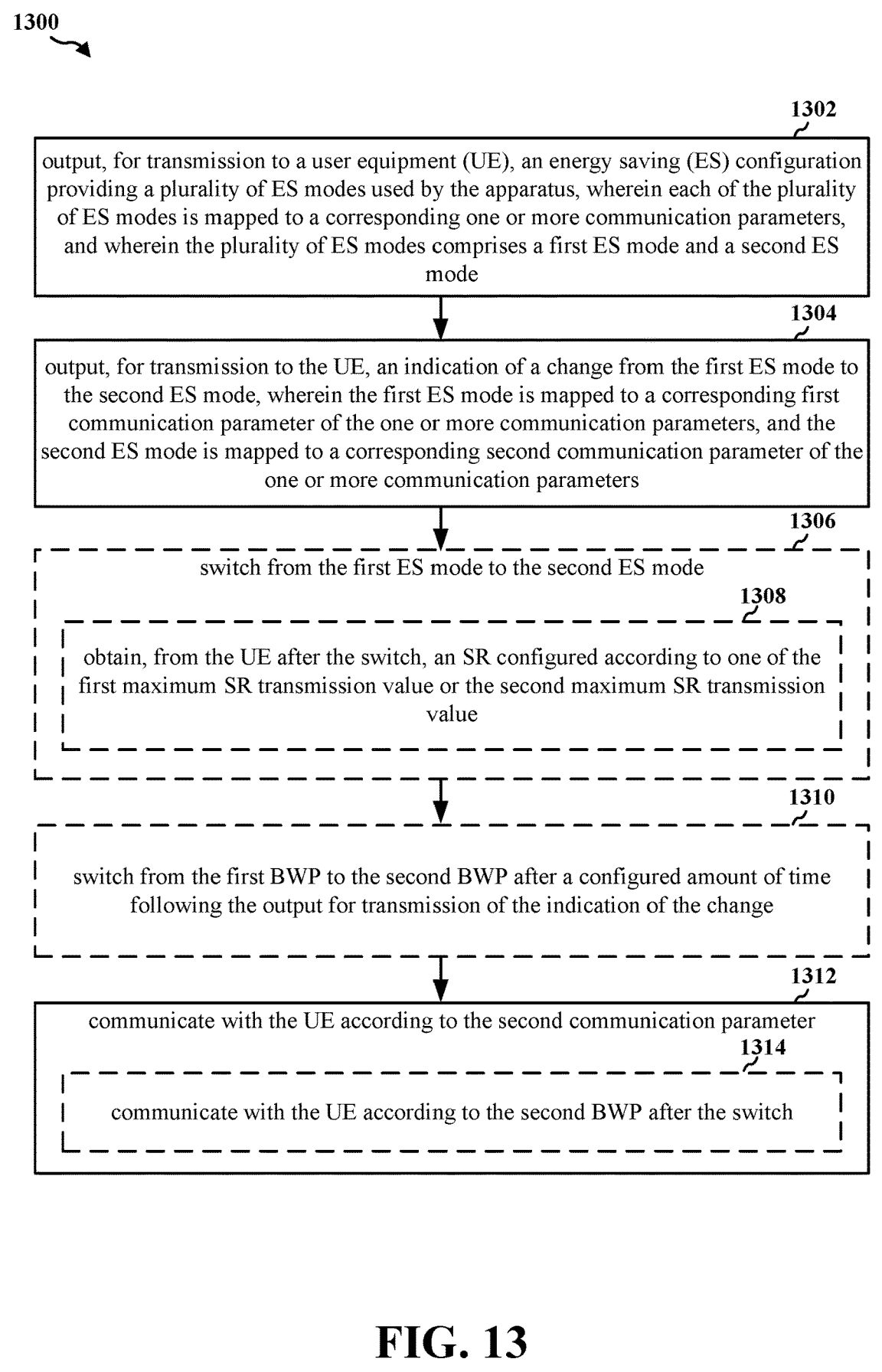

SWITCHING BANDWIDTH PARTS (BWPS) BASED ON ENERGY SAVINGS MODES

BACKGROUND

Technical Field

The present disclosure generally relates to communication systems, and more particularly, to communications based on a network energy savings mode.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus for wireless communications, comprising: a memory comprising instructions and one or more processors configured to execute the instructions. In some examples, the apparatus is configured to obtain, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode. In some examples, the apparatus is configured to obtain, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In some examples, the apparatus is configured to communicate with the network node using the second communication parameter.

Certain aspects are directed to an apparatus for wireless communications, comprising: a memory comprising instructions; and one or more processors configured to execute the instructions. In some examples, the apparatus is configured to output, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprise a first ES mode and a second ES mode. In some examples, the apparatus is configured to output, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In certain aspects, the apparatus is configured to communicate with the UE according to the second communication parameter.

Certain aspects are directed to a method for wireless communications at an apparatus. In some examples, the method includes obtaining, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode. In some examples, the method includes obtaining, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In some examples, the method includes communicating with the network node using the second communication parameter.

Certain aspects are directed to a method for wireless communications at an apparatus. In certain aspects, the method includes outputting, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprise a first ES mode and a second ES mode. In certain aspects, the method includes outputting, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In certain aspects, the method includes communicating with the UE according to the second communication parameter.

Certain aspects are directed to an apparatus for wireless communications. In some examples, the apparatus includes means for obtaining, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode. In some examples, the apparatus includes means for obtaining, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In some examples, the apparatus includes means for communicating with the network node using the second communication parameter.

Certain aspects are directed to an apparatus for wireless communications. In certain aspects, the apparatus includes means for outputting, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprise a first ES mode and a second ES mode. In certain aspects, the apparatus includes means for outputting, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In certain aspects, the apparatus includes means for communicating with the UE according to the second communication parameter.

Certain aspects are directed to a non-transitory computer-readable medium having instructions stored thereon that, when executed by an apparatus, cause the apparatus to perform operations. In some examples, the operations include obtaining, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode. In some examples, the operations include obtaining, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In some examples, the operations include communicating with the network node using the second communication parameter.

Certain aspects are directed to a non-transitory computer-readable medium having instructions stored thereon that, when executed by an apparatus, cause the apparatus to perform operations. In some examples, the operations include outputting, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprise a first ES mode and a second ES mode. In some examples, the operations include outputting, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. In some examples, the operations include communicating with the UE according to the second communication parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a flowchart of a method of wireless communication.

FIG. 13 is a flowchart of a method of wireless communication.

DETAILED DESCRIPTION

Figure 1:
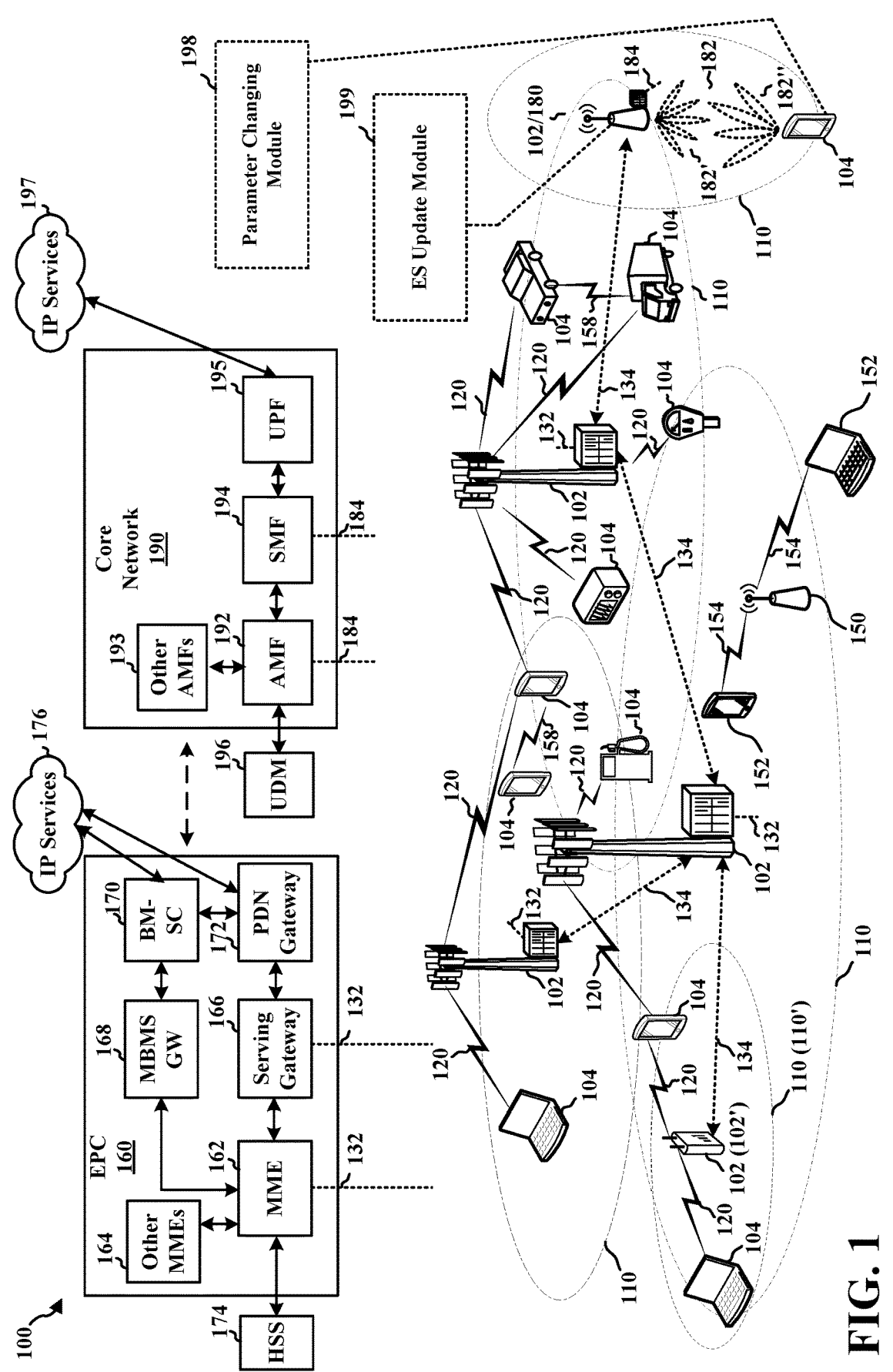
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As wireless networks grow and more users rely on wireless communication, base stations may grow to include more antennas in order to accommodate the increase in wireless communications. However, more antennas and more users may result in higher power/energy demands of the base station. As such, the base station may consume a lot of energy. In the case of, for example, green networking, an emphasis is placed on a practice of selecting energy-efficient networking technologies and products, and minimizing resource use whenever possible.

While reduced energy consumption can be achieved by adopting renewable energy resources or improving hardware design (e.g., power amplifier) to make it more energy-efficient, the cost of purchasing, replacing, and installing new equipment (including manpower, transportation, disruption to normal operation, as well as associated energy and direct cost) is often prohibitive. By comparison, approaches that work on the operating protocols of the system do not require changes to current network architecture, making them far less costly and easier for testing and implementation.

Accordingly, aspects of this disclosure are directed to reducing energy consumption of the base station by focusing on wireless communication techniques that incorporate the concept of a "sleep mode" or low-power operating modes in base stations. Such modes take advantage of changing traffic patterns and selectively switch some lightly loaded base stations to low energy consumption modes. For example, the base station does not have to activate all of its antennas in a low traffic scenario. Thus, certain aspects of the disclosure may be directed to techniques for reducing energy consumption at the base station.

Thus, in one example, the base station may use a plurality of different energy saving modes, wherein each mode is designed to save energy in a specific way while giving up certain metrics. For example, reducing the number of antennas reduces energy consumption at the cost of beamforming gain. Different energy saving modes may be suitable for different traffic loads which make a scheduling request (SR) either more frequent or less frequent. As such, optimizing the number of SRs is beneficial from a base station and a user equipment (UE) perspective because it can reduce energy consumption at both the UE and the base station.

In one example, the base station may configure a user equipment (UE) with multiple communication parameters for SRs, such as a scheduling request (SR) timer value (e.g., sr-ProhibitTimer) and a maximum SR transmission value (e.g., sr-TransMax). Each of the multiple communication parameters may be used by the UE depending on which energy saving mode is used by the base station and the UE. Thus, when the base station switches between different energy saving modes, the UE may accordingly adjust its SR communication parameters.

In one scenario, the base station may change its energy saving mode while an SR from the UE is pending (e.g., transmitted to the base station by the UE). Thus, the pending SR request was made based on a first communication parameter associated with the previous energy savings mode, but a subsequent SR request will be based on a second communication parameter associated with the current energy savings mode. In this example, the UE may maintain a current SR counter that reflects the pending SR, and maintain an sr-TransMax parameter associated with the previous energy saving mode. As such, the UE may continue to maintain the communication parameters associated with the previous energy saving mode for the pending SR, and use those communication parameters to determine whether to transmit another SR. The other SR may be transmitted using a communication parameter associated with the current energy saving mode of the base station.

In another example using the same scenario, the UE may maintain the current SR counter that reflects the pending SR, but switch a communication parameter associated with the previous energy saving mode to another communication parameter associated with the current energy saving mode. In one example, the UE may use the sr-TransMax parameter and/or sr-ProhibitTimer for the current energy saving mode. Accordingly, the UE maintains a part of the SR configuration associated with the previous energy saving mode, while also partially adjusting to the new energy saving mode.

In yet another example using the same scenario, the UE may reset the SR counter value once it determines that the base station has changed its energy savings mode. In this example, the UE may also switch to the communication parameter(s) associated with the current energy saving mode. As such, the UE resets the SR configuration and uses the communication parameter(s) associated with the current energy saving mode.

In another scenario, the base station may change its energy saving mode while the UE is preparing an SR via an SR process at the UE (e.g., prior to transmitting the SR to the base station). In one example, the UE may terminate the SR process until the base station has switched to a new energy saving mode. Once the new energy saving mode is established at the base station, the UE may restart the SR process using communication parameters associated with the new energy saving mode, or by performing an initial access process with the base station if the UE is not configured with communication parameters associated with the new energy saving mode. In another example using the same scenario, the UE may pause the SR process and resume it using communication parameters of the new energy saving mode once the base station has begun operating according to the new energy saving mode.

In some examples, different network energy saving modes may require different bandwidth part (BWP) configurations. A UE may be configured with multiple BWPs with only one of them being active for wireless communication. In certain aspects of the disclosure, the base station may configure the UE with BWPs that are grouped according to one or more energy saving modes associated with each of the BWPs so that only certain BWPs may be active only while the base station operates using certain network energy saving modes. Such grouping enables efficient switching of energy modes and reduces latency because certain of the BWPs may apply to more than one energy saving mode. For example, a first BWP may be associated with a first energy saving mode and a second energy saving mode so that the UE does not have to change the BWP during a change from the first energy saving mode to the second energy saving mode, and vice versa. This also reduces the amount of signaling because the UE would not have to transmit any BWP signaling during or after a mode change. This also enables the UE to be configured with multiple BWPs for each energy mode, providing the UE with a more comprehensive wireless communication capability.

Thus, in certain aspects, the base station may configure the UE with one or more BWPs for each energy saving mode used by the base station and UE, wherein at least one of the BWPs are configured to operate in more than one energy saving mode. In some examples, the base station may configured the UE with the BWPs using a BWP configuration information element (IE) during radio resource control (RRC) configuration. That is, the BWP configuration may identify all the network energy saving modes to which each of the BWPs are associated with.

In certain aspects, the UE may be actively communicating with the base station using a first BWP that is associated with only an active energy saving mode used by the base station and UE. In this example, if the base station changes its energy saving mode, the base station may transmit an indication to the UE to notify it of the change. The UE may treat the indication as an implicit command to change the current BWP to a new BWP associated with the new energy saving mode. In one example, the base station may configure the UE with a timing value (e.g., a number of symbols/slots/ etc.) that the UE will use to change to the new BWP. In this example, the UE may wait, after receiving the indication of the energy saving mode change, for the duration of the timing value before switching to the new BWP.

In certain aspects, if the base station switches to a new energy saving mode, the UE may switch from a current BWP to a new BWP associated with the new energy saving mode. In some examples, the UE may be required to perform random access after switching to the new BWP. However, in some examples, the new BWP may not be configured as an initial access BWP. In such examples, the UE may fall back to an initial access BWP in order to perform the random access process. Thus, in certain aspects, the base station may configure the UE with an initial access BWP for each energy saving mode, or a subset of energy saving modes. In a scenario where there are multiple initial access BWPs, there may be a mapping between each energy saving mode and at least one BWP.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. Throughout the disclosure, a "network node" may be used to refer to a base station. A network node or base station can be implemented as an aggregated base station, as a disaggregated base station, an integrated access and backhaul (IAB) node, a relay node, a sidelink node, etc. A network node can be implemented in an aggregated or monolithic base station architecture (e.g., FIG. 4), or alternatively, in a disaggregated base station architecture (e.g., FIGS. 5 and 6), and may include one or more of a central unit (CU), a distributed unit (DU), a radio unit (RU), a near-real time (near-RT) radio access network (RAN) intelligent controller (RIC), or a non-real time (non-RT) RIC.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PlayStation (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 may include a parameter changing module 198 configured to obtain, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode; obtain, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; and communicate with the network node using the second communication parameter.

Referring again to FIG. 1, in certain aspects, the base station 180 may include an ES update module 199 configured to output, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprises a first ES mode and a second ES mode; output, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; and communicate with the UE according to the second communication parameter.

Figures 2A, 2B, 2C, 2D:
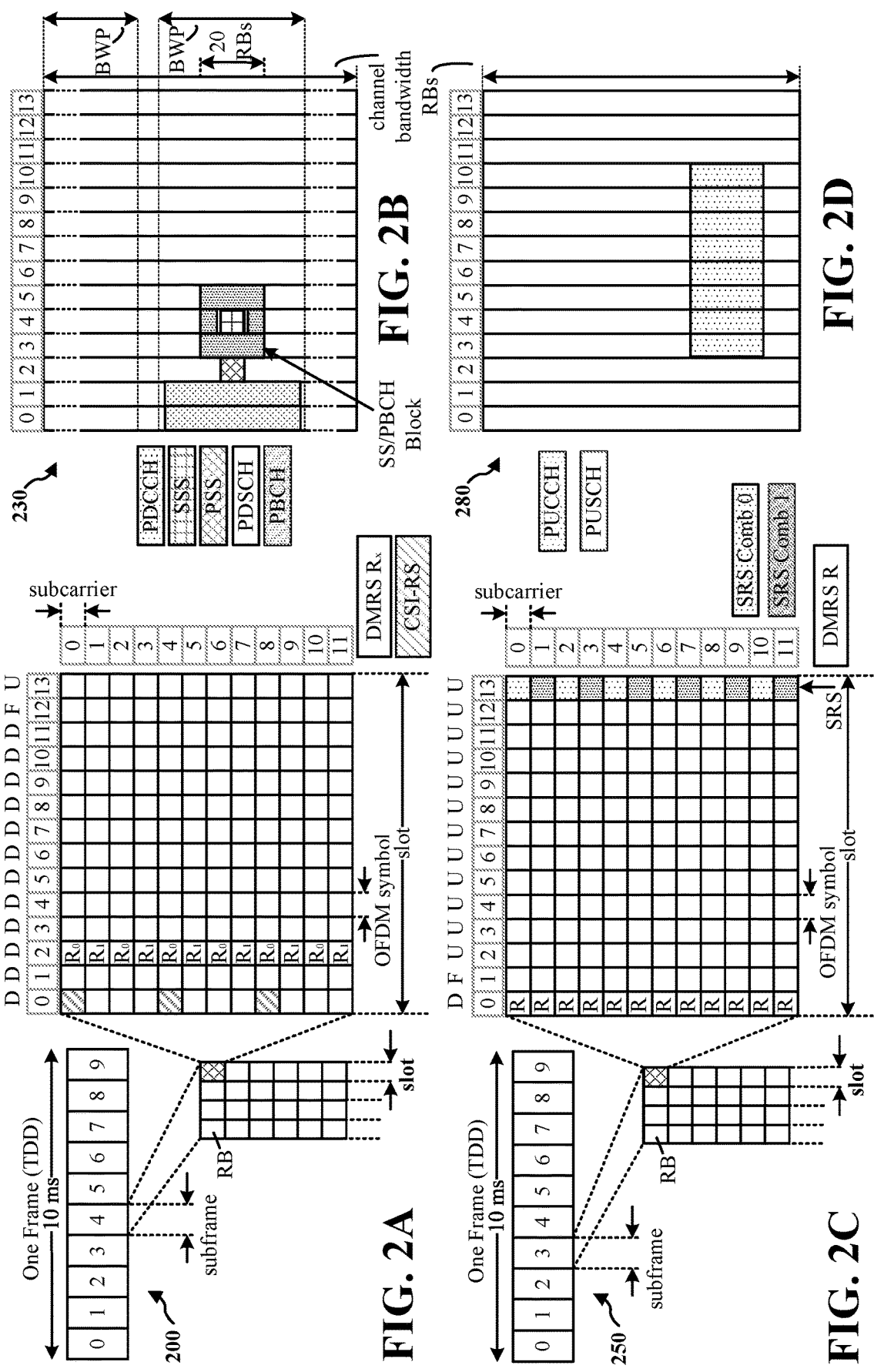
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The sub-carrier spacing and symbol length/duration are a function of the numerology. The subcarrier spacing may be equal to $2^\mu * 15$ kilohertz (kHz), where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
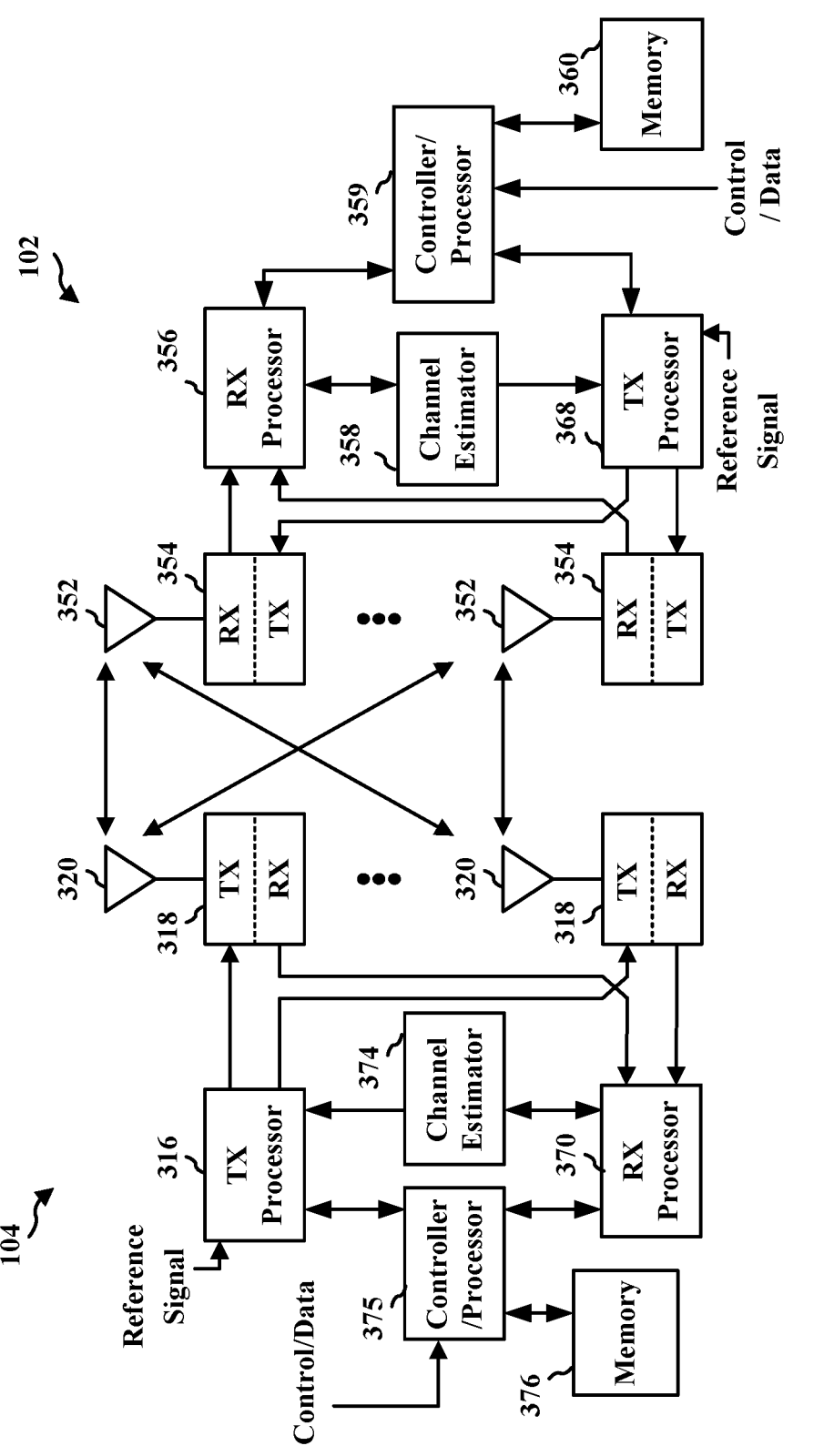
FIG. 3 is a diagram illustrating an example of a base station and user equipment (UE) in an access network.

FIG. 3 is a block diagram of a base station 102 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the parameter changing module 198 of FIG. 1.

At least one of the TX processor 316, the RX processor 370, and the controller/processor 375 may be configured to perform aspects in connection with ES update module 199 of FIG. 1.

Figure 4:
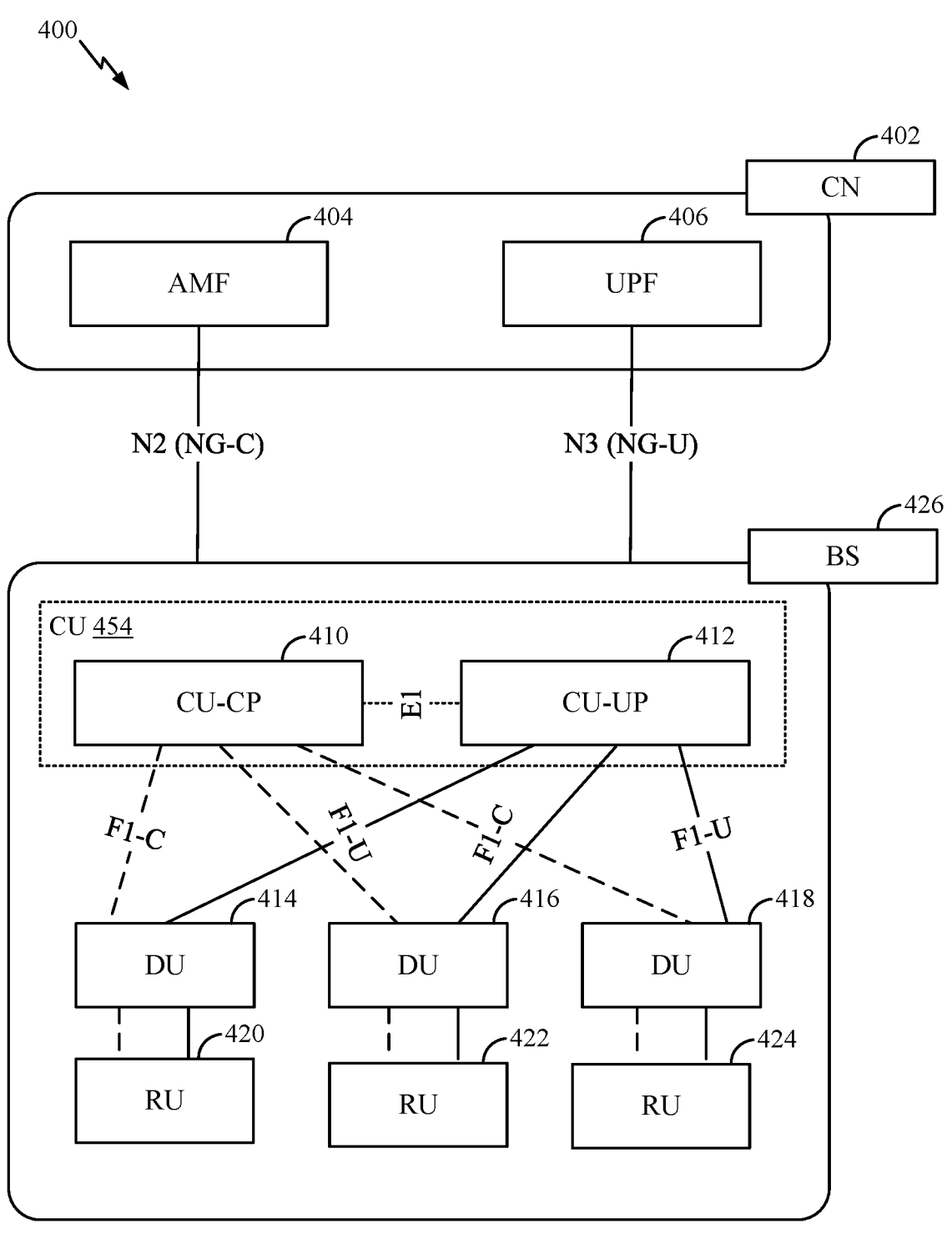
FIG. 4 is a block diagram illustrating an example mono-lithic (e.g., disaggregated) base station and architecture of a distributed radio access network (RAN).

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

Figure 5:
FIG. 5 is a block diagram illustrating an example disaggregated base station architecture.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit—user plane (CU-UP)), control plane functionality (i.e., central unit—control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 120. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Figure 6:
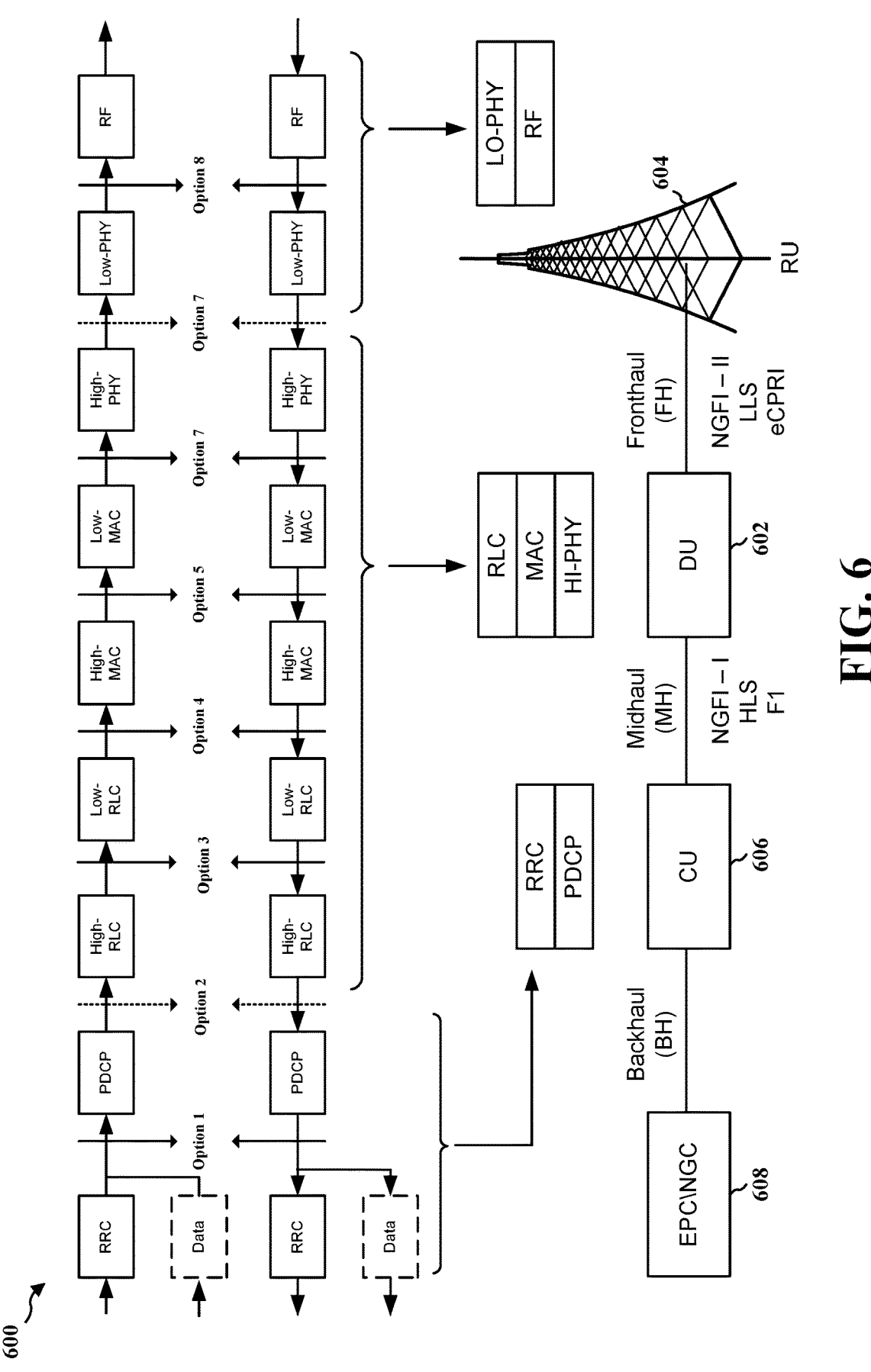
FIG. 6 is a block diagram illustrating an example of functional split between a central unit (CU) and a distributed unit (DU) in a network.

FIG. 6 is a block diagram 600 illustrating an example of functional split between a central unit (CU) 606 and a DU 602 in a network. The CU 606 may be a logical node that includes the base stations functions such as transferring of user data, mobility control, session management etc., except functions exclusive to the DU 602. The CU 606 may be connected to the core network (e.g., EPC 608) via a backhaul (BH) interface and may control the operation of multiple DUs 602 over a midhaul (e.g., MH or F1) interface. The DU 602 may be a logical node that includes a subset of the base station functions, where its operation may be controlled by the CU 606. The DU 602 may further be split or separated into the DU 602 and the RU 604 under the O-RAN architecture, such as described in connection with FIG. 5, where the DU 602 may communicate with the RU 604 via the FH interface. The network functionalities, such as functionalities associated with the PDCP, RLC, MAC, PHY network layers, etc., may be split between the CU 606, the DU 602 and the RU 604. For example, the functionalities may be split such that the CU 606 may be responsible for processing functionalities associated with the RRC and PDCP layers, the DU 602 may be responsible for processing functionalities associated with the RLC, MAC and HI-PHY (e.g., PHY-High) layers, and the RU 604 may be responsible for processing functionalities associated with the LO-PHY (e.g., PHY-Low) and RF layers, etc.

Example Scheduling Request (SR) Configurations for Network Energy Saving Modes A scheduling request (SR) is a physical layer message used by a UE to request an uplink grant from a base station so that the UE can transmit uplink signaling (e.g., via physical uplink shared channel (PUSCH)). In certain communication systems (e.g., 5G, LTE), a base station may configure a UE to utilize an SR scheme for communications. For example, a UE may prepare an SR for transmission based at least in part on a set of pre-configured communication parameters provided to the UE via radio resource control (RRC) signaling from the base station. Based at least in part on the set of communication parameters, the UE may determine a resource allocation for the SR; an offset, periodicity, and time location for the SR; a maximum quantity of SR retransmissions to attempt (e.g., sr-TransMax); a prohibit timer threshold (e.g., sr-ProhibitTimer); and/or the like. The UE may transmit the SR to the base station, and may receive an uplink grant as a response from the base station.

In some examples, the prohibit timer is a threshold period of time before a retransmission of an SR may be attempted. For instance, the prohibit timer may be used to avoid unnecessary SR transmissions and reduce signal load on a physical uplink control channel (PUCCH). The prohibit timer may take values from ms1 to ms128 (e.g., {ms1, ms2, ms4, ms8, ms16, ms32, ms64, ms128}), where each value is a number of milliseconds (e.g., ms1 corresponds to 1 millisecond, ms2 corresponds to 2 milliseconds, and so on). The UE may refrain from transmitting an SR while the prohibit timer is running.

In some examples, after transmitting a first SR on PUCCH, if the UE doesn't receive uplink resources from the base station, then based on the periodicity, the UE may re-transmit the SR. The UE may continue to re-transmit the SR for the maximum quantity of SR retransmissions if the UE doesn't receive uplink resources from the base station. After transmitting the SR the maximum number of times, the UE may release the SR resources (e.g., frequency and time), cancel all pending SRs, and initiate a random access procedure. In some examples, the UE may maintain an SR counter, and may increment the SR counter every time it transmits an SR. In this example, the UE may continue to transmit SRs so long as the SR counter is less than the sr-TransMax value. If the SR counter is equal to the sr-TransMax value, then the UE may refrain from transmitting another SR. If the UE receives an uplink grant in response to an SR, then the UE may reset the counter or decrement the counter by the number of SRs transmitted requesting the uplink grant.

Figure 7:
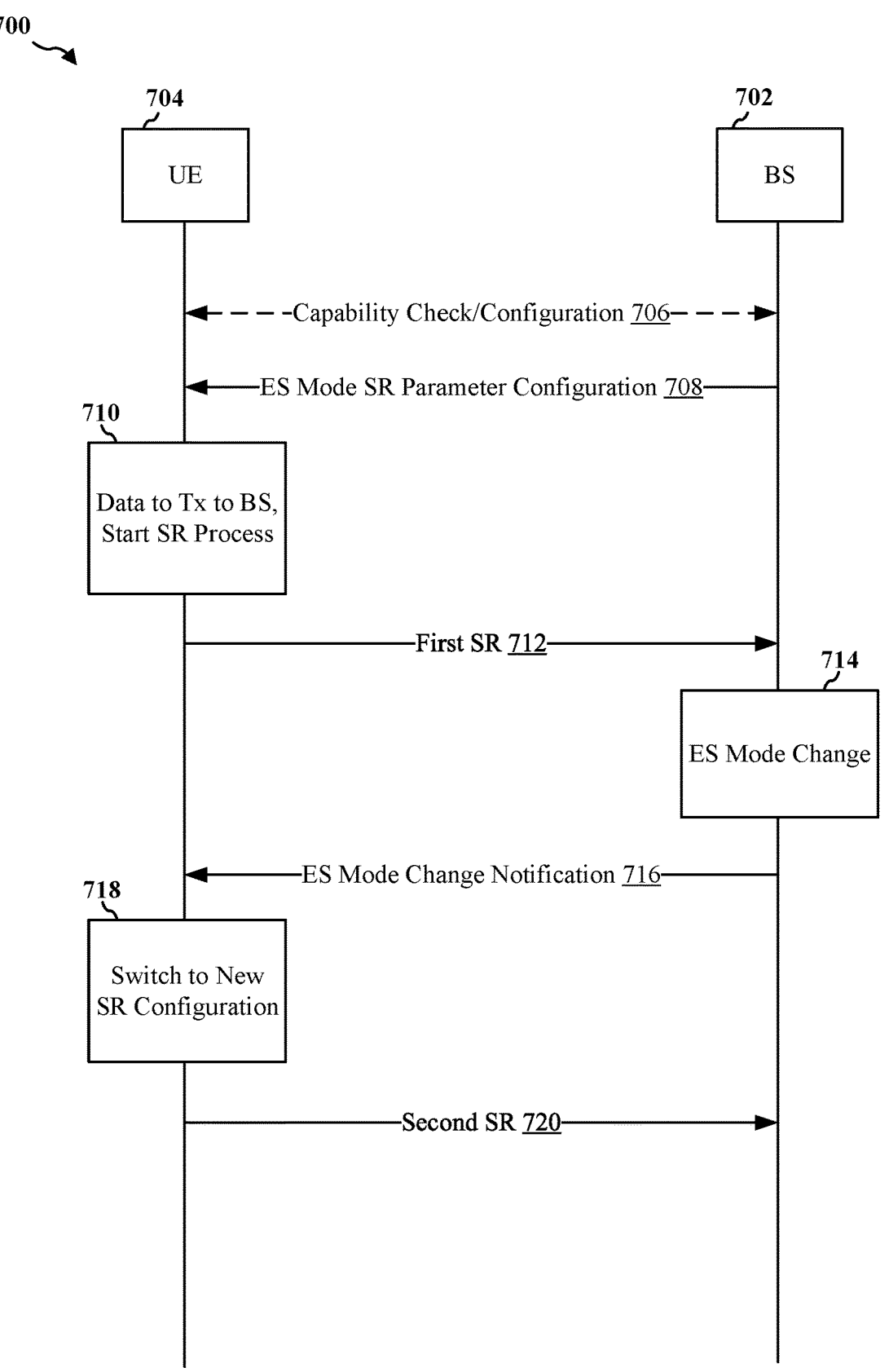
FIG. 7 is a call-flow diagram illustrating example communications between a UE and a base station.

FIG. 7 is a call-flow diagram 700 illustrating example communications between a UE 704 (e.g., UE 104 of FIG. 1) and a base station 702 (e.g., base station 102 of FIG. 1). An RRC connection may be established between the UE 704 and the base station 702.

As discussed, a base station 702 may configure a UE 704 with communication parameters for preparing and transmitting an SR. In certain aspects, the base station 702 may also configure the UE 704 with an energy saving (ES) configuration that provides the UE 704 with a mapping between a plurality of ES modes initiated by the base station 702 (e.g., used by both the UE 704 and the base station 702) and a plurality of communication parameters associated with SR configurations. That is, each of the plurality of ES modes may be mapped to a corresponding one or more communication parameters (e.g., an SR timer value (e.g., sr-Prohibit-Timer) and a maximum SR transmission value (e.g., sr-TransMax)). For example, a first ES mode may correspond to a first sr-TransMax value and/or a first sr-ProhibitTimer, while a second ES mode may correspond to a second sr-TransMax value and/or a second sr-ProhibitTimer.

However, prior to configuring the UE 704 with the ES configuration, the base station may optionally perform a capability check and/or configuration process 706 with the UE 704. During the process 706, the base station 702 may transmit a request to the UE 704 requesting confirmation that the UE 704 is capable of changing its SR configuration according to ES mode changes at the base station 702. In response to the request, the UE 704 may confirm the capability. If the UE 704 responds indicating that it is not configured for the capability, the base station 702 may provide information to configure the UE 704 and enable the capability at the UE 704. In some examples, the process 706 may include the UE 704 transmitting an unsolicited indication to the base station that the UE 704 is capable of changing its SR configuration according to ES mode changes at the base station 702.

At a first transmission 708, the base station 702 may transmit the ES configuration to the UE 704, providing it with a mapping between a plurality of ES modes initiated by the base station 702 and a plurality of communication parameters associated with SR configurations. That is the ES configuration may include information defining and/or identifying each of a plurality of ES modes, information defining and/or identifying communication parameters associated with one or more SR configurations, and a mapping configured to associate each of the plurality of ES modes with an SR configuration. As such, the UE 704 may be configured with ES mode-specific SR configurations. Accordingly, the UE 704 is able to dynamically change its SR configurations according to the ES mode being initiated by the base station. Thus, if the base station changes its energy saving mode, the UE 704 may switch to a corresponding SR configuration without having to perform an RRC configuration. This reduces the amount of signaling required to change an SR configuration, and allows the UE 704 to optimize its SR configuration according to the ES mode of the base station 702. The ES configuration may also provide the UE 704 with an indication of the current ES mode being initiated by the base station 702. For example, the base station 702 may be operating using a first ES mode. Accordingly, the UE may configure its SR communication parameters according to first communication parameter(s) associated with the first ES mode.

At a first process 710, the UE 704 may begin an SR process based on the UE 704 having data to transmit to the base station 702. For example, the UE 704 may determine whether another SR has been transmitted (e.g., whether an sr-ProhibitTimer is or is not complete), and whether a PUCCH has been configured for transmission of an SR between the UE 704 and the base station 702. If an sr-ProhibitTimer is not running, and a PUCCH has been established, then the UE 704 may determine whether an SR counter is less than sr-TransMax. That is, the UE 704 may determine whether it has transmitted a maximum quantity of pending SR transmissions. One or more of the sr-Prohibit-Timer and the sr-TransMax may be defined by the first communication parameter(s) associated with the first ES mode. If the SR counter is less than sr-TransMax, then the UE 704 may prepare and transmit a first SR to the base station in a second transmission 712. Upon transmission of the first SR, the UE 704 may increment the SR counter and start the sr-ProhibitTimer.

At a second process 714, the base station 702 may determine to change from the first ES mode to a second ES mode while the transmitted first SR is still pending. Based on the determination, the base station 702 may transmit an ES mode change notification to the UE 704 via a third transmission 716. The ES mode change notification may provide the UE 704 with an indication of a change from the first ES mode to a second ES mode, wherein the first ES mode is mapped to the first communication parameter(s), and the second ES mode is mapped to a corresponding second communication parameter(s). As such, the UE 704 may receive the ES mode change notification and, in response to the notification, determine to switch from the first communication parameter(s) to the second communication parameter(s) for SRs.

Accordingly, at a third process 718, the UE 704 may change one or more of the sr-TransMax and sr-Prohibit-Timer values from those indicated by the first communication parameter(s) to the values indicated by the second communication parameter(s) in response to the ES mode change notification. Thus, any subsequently transmitted SR may be transmitted according to the values indicated by the second communication parameter(s). However, because the first SR of the second transmission 712 is still pending, a subsequently transmitted SR may be prepared and transmitted using one of several different methods.

In a first method, an assumption is that a first communication parameter associated with the first ES mode is a first maximum SR transmission value (e.g., an sr-TransMax value associated with the first SR of the second transmission 712), and a second communication parameter associated with the second ES mode is a second maximum SR transmission value. Here, while the first SR is still pending, the UE may maintain the SR counter value despite the ES mode change, and may perform the SR process without resetting the SR counter value. Thus, if the SR counter was 0 before transmission of the first SR, then the UE 704 may have incremented the SR counter to 1 after transmission of the first SR. Accordingly, the UE 704 may perform the SR process for preparing and transmitting a second SR after the ES mode change according to an SR counter that equals 1. Upon transmitting the second SR, the UE 704 may increment the SR counter to 2, and may continue to increment the SR counter with each subsequently transmitted SR until the UE 704 receives a response from the base station 702.

In one example, the UE 704 may prepare and transmit the second SR to the base station 702 in a fifth transmission 720 based on the maintained SR counter value (e.g., 1) being less than the sr-TransMax value associated with the first ES mode (e.g., the sr-TransMax value associated with the first SR of the second transmission 712). In another example, the UE 704 may prepare and transmit the second SR to the base station 702 in the fifth transmission 720 based on the maintained SR counter value (e.g., 1) being less than the sr-TransMax value associated with the second ES mode (e.g., the resulting sr-TransMax value after the ES mode change).

In a second method, using the same assumptions of the first method, the UE may reset the SR counter value in response to the ES mode change and may perform the SR process with the SR counter equal to 0. Accordingly, the UE 704 may perform the SR process for preparing and transmitting a second SR after the ES mode change according to an SR counter that equals 0 regardless of the number of SR transmission performed prior to the ES mode change. Upon transmitting the second SR, the UE 704 may increment the SR counter to 1, and may continue to increment the SR counter with each subsequently transmitted SR until the UE 704 receives a response from the base station 702. Any subsequent SR transmissions may be limited by the sr-TransMax value associated with the second ES mode.

At a fifth transmission 720, the UE 704 may transmit a second SR to the base station 702, wherein the second SR is generated based on communication parameters associated with the second ES mode.

Figure 8:
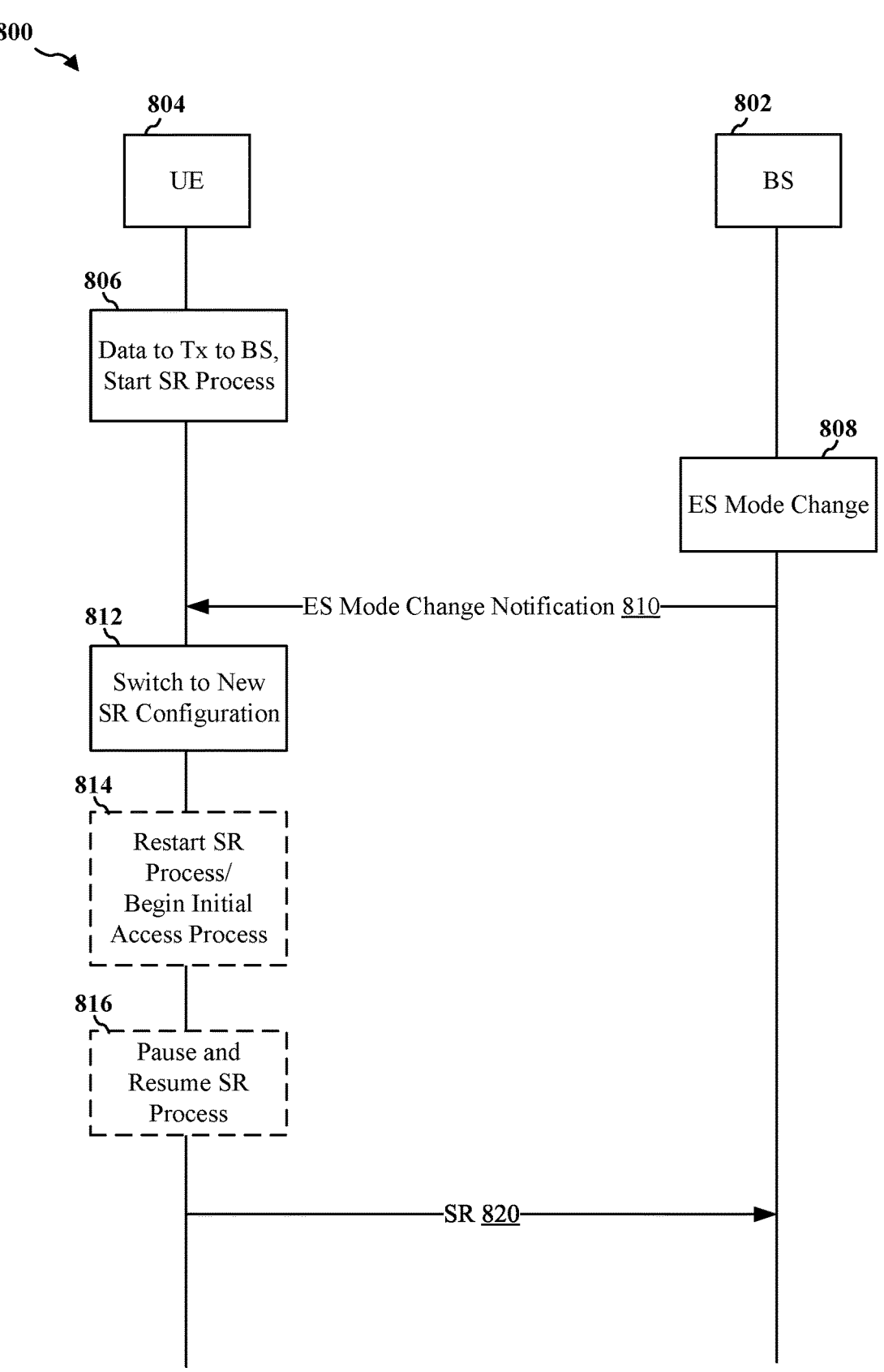
FIG. 8 is a call-flow diagram illustrating example communications between a UE and a base station.

FIG. 8 is a call-flow diagram 800 illustrating example communications between a UE 804 (e.g., UE 104 of FIG. 1) and a base station 802 (e.g., base station 102 of FIG. 1). An RRC connection may be established between the UE 804 and the base station 802. It should be noted that the UE 804 and the base station 802 may initially perform the same capability check and/or configuration process 706 and/or the first transmission 708 of FIG. 7.

At a first process 806, the UE 804 may begin an SR process based on the UE 804 having data to transmit to the base station 802. For example, the UE 804 may determine whether another SR has been transmitted (e.g., whether an sr-ProhibitTimer is or is not complete), and whether a PUCCH has been configured for transmission of an SR between the UE 804 and the base station 802. If an sr-ProhibitTimer is not running, and a PUCCH has been established, then the UE 804 may determine whether an SR counter is less than sr-TransMax. That is, the UE 804 may determine whether it has transmitted a maximum quantity of pending SR transmissions. One or more of the sr-Prohibit-Timer and the sr-TransMax may be defined by the first communication parameter(s) associated with the first ES mode. If the SR counter is less than sr-TransMax, then the UE 804 may prepare and transmit a first SR to the base station in a second transmission 820. Upon transmission of the first SR, the UE 804 may increment the SR counter and start the sr-ProhibitTimer.

Prior to or during the first process 806, the base station 802 may determine to change from the first ES mode to a second ES mode during a second process 808. Based on the determination, the base station 802 may transmit an ES mode change notification to the UE 804 via a first transmission 810. The ES mode change notification may provide the UE 804 with an indication of a change from the first ES mode to a second ES mode, wherein the first ES mode is mapped to the first communication parameter(s), and the second ES mode is mapped to a corresponding second communication parameter(s). As such, the UE 804 may receive the ES mode change notification and, in response to the notification, determine to switch from the first commu-nication parameter(s) to the second communication param-eter(s) for SRs.

At a third process 812, the UE 804 may change one or more of the sr-TransMax and sr-ProhibitTimer values from those indicated by the first communication parameter(s) to the values indicated by the second communication param-eter(s) in response to the ES mode change notification. Thus, any subsequently transmitted SR may be transmitted accord-ing to the values indicated by the second communication parameter(s).

During the third process 812, the UE 804 may stop or terminate the preparation of the SR for transmission of the first process 806 and defer preparation of the SR until after the UE 804 has switched to the second ES mode. For example, once the UE 804 has switched to the new ES mode, the UE 804 may restart the SR process at a fourth process 814. If the UE 804 has an SR configuration for the second ES mode, then the UE 804 may restart the SR process and generate an SR according to the second communication parameters associated with the second ES mode. However, if the UE 804 was not configured for the second ES mode, then the UE 804 may perform an initial access process with the base station 802 instead of the SR process.

Alternatively, during the third process 812, the UE 804 may pause the preparation of the SR for transmission of the first process 806 and resume the preparation of the SR after the UE 804 has switched to the second ES mode during a fifth process 816. That is, in certain embodiments, the UE 804 may switch from the first communication parameter(s) to the second communication parameter(s), wherein the switch is configured to pause the SR process (e.g., the SR process being performed based on the first communication parameter(s)) performed by the UE 804 during the switch. Once the switch is complete, the UE 804 may resume the SR process using the same first communication parameter(s). The UE 804 may then output, for transmission after the switch, the SR using the first communication parameter. Thus, the UE 804 may initiate an SR process that prepares an SR for transmission using the first communication param-eter, and pause the SR process during the switch. The UE may then resume the SR process after the switch and transmit the SR using the first communication parameter. As such, the SR is completed after resuming the SR process after the switch.

At a second transmission 820, the UE 804 may transmit the SR to the base station.

Example Bandwidth Part (BWP) Configurations for Network Energy Saving Modes

In certain aspects, different network ES modes may require different BWP configurations. Accordingly, a UE may be configured with multiple BWPs while only one of them is active for communications between the UE and a base station. In some examples, the multiple BWPs may be separated into groups, with each group being associated with a particular ES mode. Thus, the UE may activate a BWP in a particular group when that group corresponds to an active ES mode at the base station. Such an operation may enable efficient switching and reduce latency. For example, if multiple ES modes are associated with a single BWP, then neither of the base station or the UE may be required to switch from one BWP to another BWP every time the base station changes its ES mode. As such, the UE is not required to perform RRC reconfiguration with each ES mode change. Thus, in certain aspects, the base station may configure the UE with BWP groups that belong to different ES modes.

Figure 9:
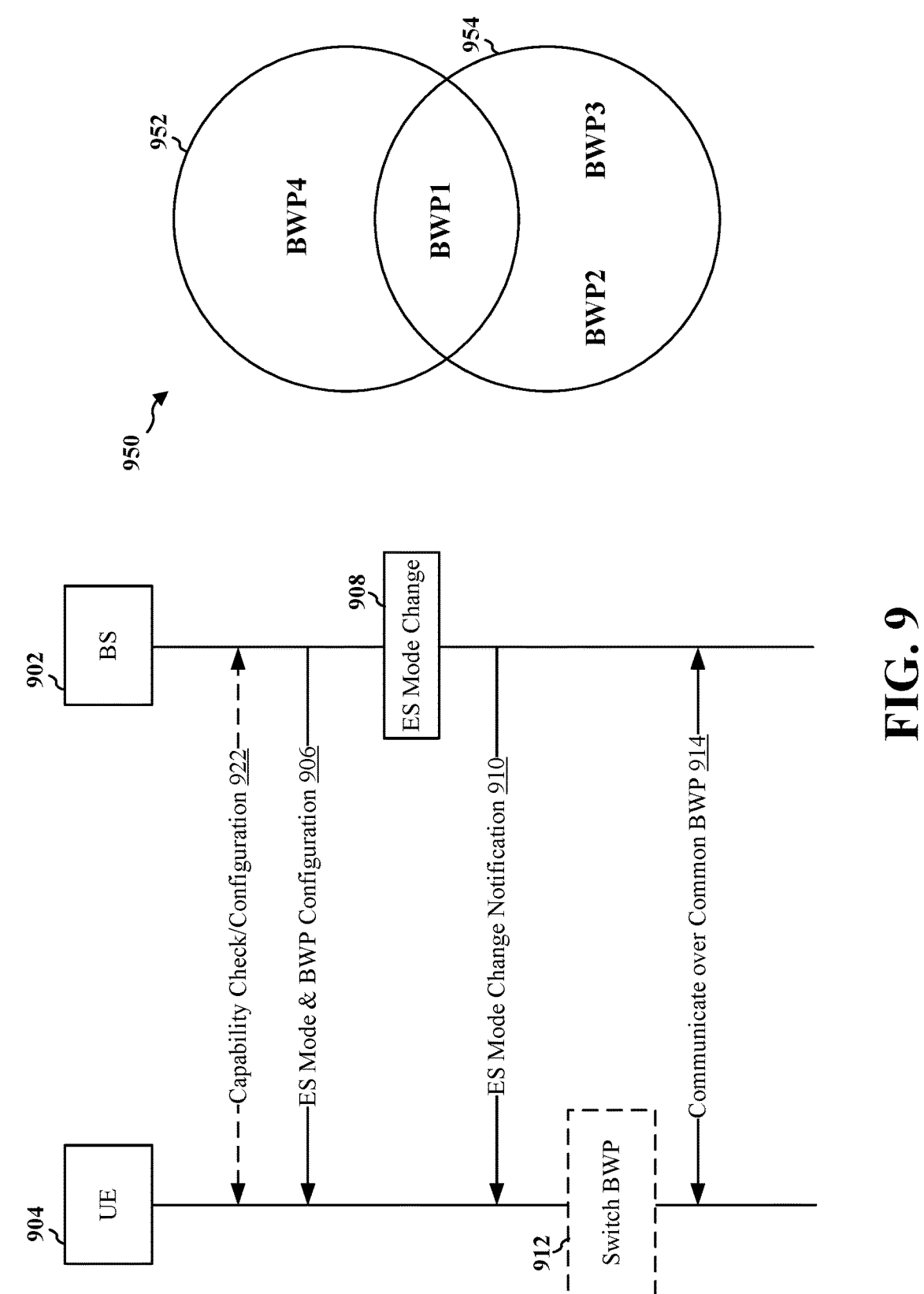
FIG. 9 is a call-flow diagram illustrating example communications between a UE and a base station, and an example of bandwidth part (BWP) grouping with corresponding energy saving (ES) modes.

FIG. 9 is a call-flow diagram 900 illustrating example communications between a UE 904 (e.g., UE 104 of FIG. 1) and a base station 902 (e.g., base station 102 of FIG. 1), and an example of BWP grouping 950 with corresponding ES modes. An RRC connection may be established between the UE 904 and the base station 902. It should be noted that the UE 904 and the base station 902 may initially perform the same capability check and/or configuration process 706 and/or the first transmission 708 of FIG. 7 to configure the UE 904 with one or more SR configurations described in FIGS. 7 and 8 and/or a BWP configuration.

For example, the base station 902 may configure the UE 904 with communication parameters for communicating with the base station 902 in an ES configuration communi-cation 906. The ES configuration communication 906 may be an RRC configuration message. In one example, the RRC configuration message may include an information element (IE) that provides the UE 904 with all of the ES modes that a BWP can be used with for communication with the base station 902. For example, the IE may provide:

BWP1: {64 antennas (id=0) and 16 antennas (id=1)}

BWP2: {64 antennas (id=1) and 8 antennas (id=1)}

Here, "64 antennas" is a first ES mode, "16 antennas" is a second ES mode, and "8 antennas" is a third ES mode. "BWP1" and "BWP2" may be an identifier corresponding to each BWP (e.g., bwp-Id, bwp-Common, bwp-Dedicated IEs). In this example, BWP1 may be assigned another identifier (id=0) for the first ES mode and yet another identifier (id=1) for the second ES mode. Similarly, BWP2 may be assigned another identifier (id=1) for the first ES mode and the same identifier (id=1) for the third ES mode. As such, in the first ES mode, BWP1 may be identified as 0 and BWP2 may be identified as 1 in the RRC configuration IE. BWP1 may be identified as 1 in the second ES mode, BWP2 may be identified as 1 in the third ES mode.

In certain aspects, the communication parameters may include a plurality of ES modes and corresponding BWPs. For example, the base station 902 may configure the UE 904 with an energy saving (ES) configuration that provides the UE 904 with a mapping between a plurality of ES modes initiated by the base station 902 and one or more BWPs associated with each of the ES modes. That is, each of the plurality of ES modes may be mapped to a corresponding one or more communication parameters (e.g., a BWP identifier). For example, a first ES mode 952 may correspond to two BWPs identified as BWP1 and BWP4, and a second ES mode 954 may correspond to three BWPs identified as BWP1, BWP2, and BWP3. Thus, BWP1 and BWP4 are a first group associated with the first ES mode 952, and BWP1, BWP2, and BWP3 are a second group associated with the second ES mode 954. Accordingly, BWP1 may be an active BWP for communication between the UE 904 and the base station 902 when the base station 902 uses either of the first ES mode 952 or the second ES mode 954. For example, if the base station 902 and the UE 904 communicate over active BWP1 while the base station 902 is operating under the first ES mode 952, and the base station 902 switches to operation under the second ES mode 954, communications may continue using the active BWP1.

Prior to configuring the UE 904 with the ES modes and corresponding BWP groups, the base station 902 may optionally perform a capability check 922 with the UE 904. During the capability check 922, the base station 902 may transmit a request to the UE 904 requesting confirmation that the UE 904 is capable of changing BWPs according to ES mode changes at the base station 902. In response to the request, the UE 904 may confirm the capability. If the UE 904 responds indicating that it is not configured for the capability, the base station 902 may provide information to configure the UE 904 and enable the capability at the UE 904. In some examples, the capability check 922 may include the UE 904 transmitting an unsolicited indication to the base station 902 that the UE 904 is capable of changing BWPs according to ES mode changes at the base station 902.

At a first process 908, the base station 902 may determine to change its operations from the first ES mode 952 to the second ES mode 954. Based on the determination, the base station 902 may transmit an ES mode change notification to the UE 904 via a first transmission 910. The ES mode change notification may provide the UE 904 with an indication of a change from the first ES mode 952 to the second ES mode 954, wherein the first ES mode 952 is mapped to first communication parameters (e.g., BWP1 and BWP4), and the second ES mode is mapped to corresponding second communication parameters (e.g., BWP1, BWP2, BWP3). As such, the UE 904 may receive the ES mode change notification and, in response to the notification, determine whether to switch, during a second process 912, from a current BWP to another BWP associated with the second ES mode 954.

In this example, because BWP1 is the current BWP and it is associated with both the first ES mode 952 and the second ES mode 954, the UE may determine not to change the BWP. Thus, the UE 904 and the base station 902 may continue to communicate over common BWP1 after the ES mode change (e.g., as illustrated in communication 914). However, if BWP1 was not the current BWP, then the UE 904 may select one or BWP1, BWP2, or BWP3 to be the new active BWP for communications with the base station 902.

In some examples, the UE 904 may select a common BWP (e.g., BWP1) to be the new active BWP. In such an example, the UE 904 may select BWP1 because it is common to both the first ES 952 and the second ES 954. In such an example, the UE 904 may implicitly switch to the common BWP without notifying the base station 902. For example, the base station 902 may provide the UE 904 with a time window or a defined amount of time (e.g., pre-configured or dynamically configured) indicating a duration of time (e.g., a number of symbols/slots/etc.). The duration of time may be provided to the UE 904 via the ES configuration communication 906 or the ES mode change notification via the first transmission 910. After the base station 902 provides the UE 904 with an indication of an ES mode change, the UE 904 may switch to the common BWP for UE-to-BS communications after the duration of time expires, wherein the duration of time begins at the receipt of the notification of the ES mode change. Accordingly, the UE 904 may treat the ES mode change notification as a request that the UE 904 switch to a BWP common to: (i) the current ES mode and the future ES mode, or (ii) a BWP common to the future ES mode and one or more other ES modes (e.g., the BWP with the most common applicability across ES modes).

Figure 10A:
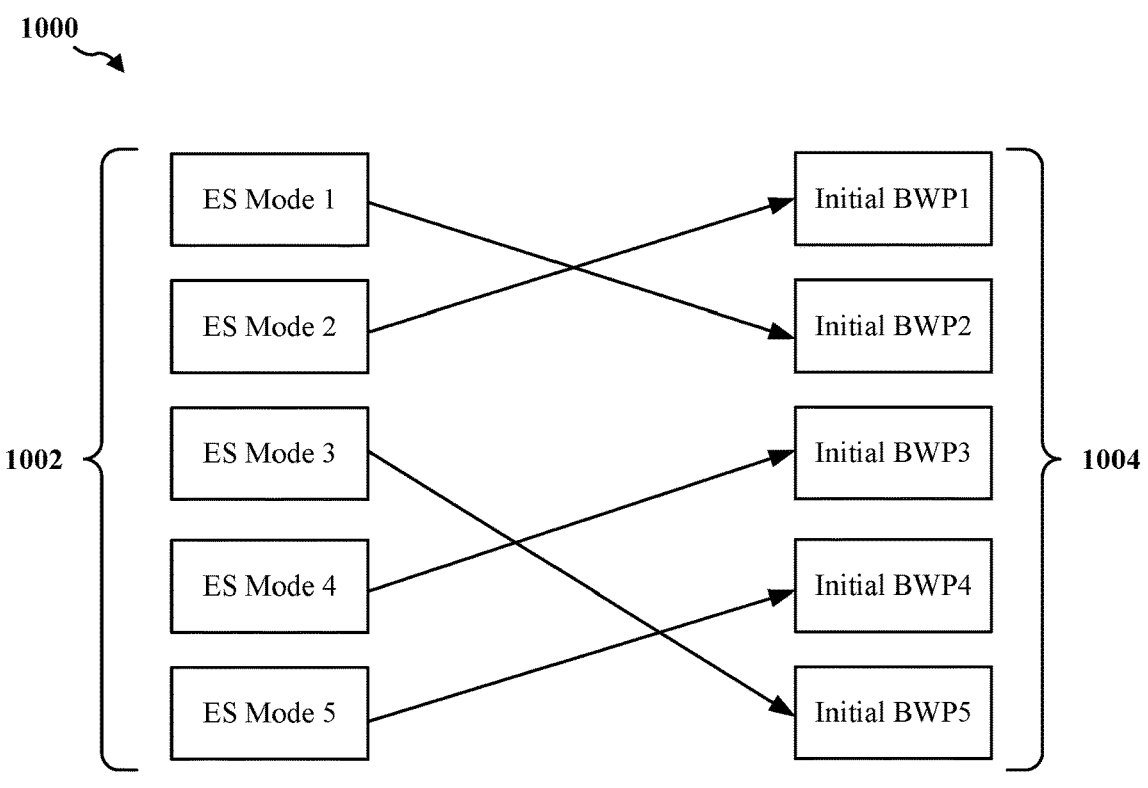
FIGS. 10A and 10B are block diagrams illustrating examples of grouping multiple ES modes with initial access BWPs.
Figure 10B:
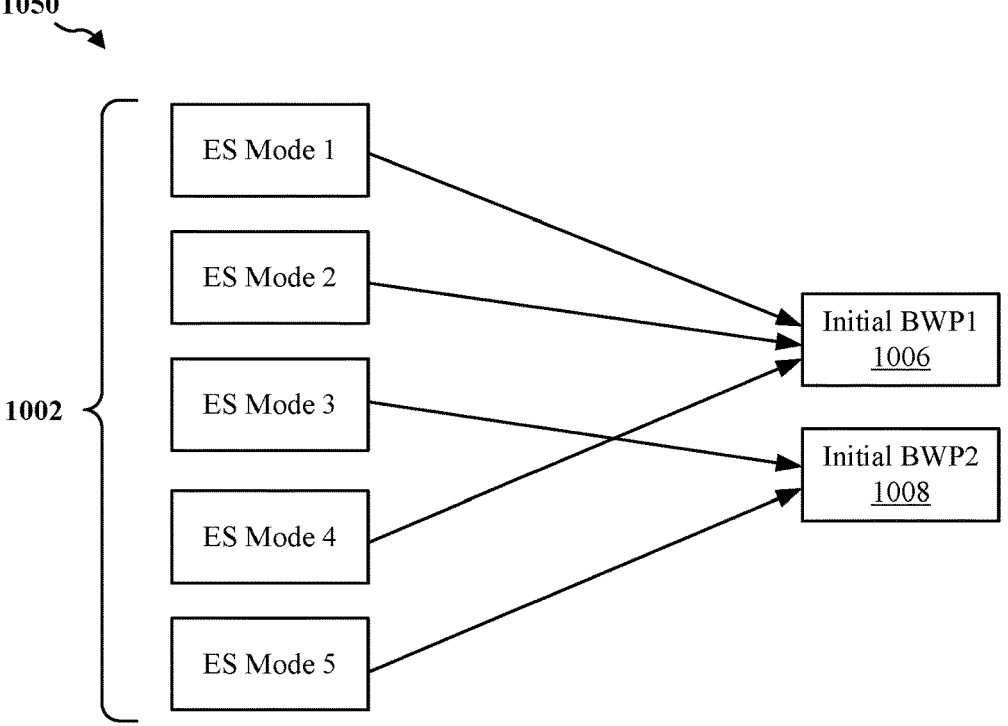

FIGS. 10A and 10B are block diagrams illustrating examples of grouping multiple ES modes with initial access BWPs. In FIG. 10A, a base station may configure the UE with a 1:1 mapping 1000 of ES modes (e.g., ES mode 1, ES mode 2, ES mode 3, ES mode 4, ES mode 5) 1002 to initial access BWPs (e.g., initial BWP1, initial BWP2, initial BWP3, initial BWP4, initial BWP5) 1004. The base station may provide such a mapping to the UE in a configuration message. As discussed, if a base station switches to a new ES mode, the UE may switch from a current BWP to a new BWP associated with the new ES mode. In some examples, the UE may be required to perform random access after switching to the new BWP. However, in some examples, the new BWP may not be configured as an initial access BWP, and thus, the UE may not be able to use it for random access procedures. In such an example, the UE may fall back to an initial access BWP in order to perform random access using the BWP configured for initial access.

Thus, in certain aspects, the base station may configure the UE with an initial access BWP for each ES mode. In a scenario where there are multiple initial access BWPs 1004, the base station may provide the UE with a mapping between each ES mode 1002 and at least one BWP of the multiple initial access BWPs 1004. In one example, if the UE determines to perform initial access, the UE may fall-back to an initial access BWP, wherein the UE is configured with an initial access BWP associated with each ES mode in a 1:1 manner. That is, one unique initial access BWP for each ES mode. Thus, if the base station is operating under a particular ES mode (e.g., ES mode 1), the UE may fallback to an initial access BWP for that ES mode for random access.

In FIG. 10B, a base station may configure a UE with a multiple-to-one mapping 1050 of the five ES modes (e.g., ES mode 1, ES mode 2, ES mode 3, ES mode 4, ES mode 5) 1002 wherein ES mode 1, ES mode 2, and ES mode 4 are associated with initial access BWP1 1006; and ES mode 3 and ES mode 5 are associated with initial access BWP2 1008. The base station may provide such a mapping to the UE in a configuration message. Here, a fallback BWP may be common among multiple ES modes.

FIG. 11 is a flowchart 1100 of a method of wireless communication. The method may be performed by a UE (e.g., the UE 104; the apparatus 1202).

At 1102, the UE may obtain, from a network node, an energy saving (ES) configuration providing a plurality of ES modes initiated by the network node, wherein each of the plurality of ES modes is mapped to a corresponding one or more communication parameters, and wherein the plurality of ES modes comprises a first ES mode and a second ES mode. For example, 1102 may be performed by an obtaining component 1240. Here, the base station may provide the UE with information about a plurality of ES modes that the base station may use, and one or more communication parameters that map to each of the ES modes. For example, the communication parameters may include a scheduling request (SR) timer value and a maximum SR transmission value, and/or one or more bandwidth parts (BWPs).

At 1104, the UE may obtain, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. For example, 1104 may be performed by the obtaining component 1240. For example, the base station may be operating under a first ES mode, but will change to a second ES mode. Accordingly, the base station may notify the UE of the ES mode change.

At 1106, the UE may optionally switch from the first communication parameter to the second communication parameter in response to the indication of the change. For example, 1106 may be performed by a switching component 1246. For example, the UE may be using a BWP or SR parameters that are inconsistent with the base station's new ES mode. Accordingly, the UE may switch to a new BWP or new SR parameters that correspond to the new ES mode.

At 1108, the UE may optionally output, for transmission prior to the switch, a first SR to the network node, wherein outputting the first SR for transmission is based on an SR counter value being less than the first maximum SR transmission value, and increment the SR counter value in response to outputting the first SR for transmission, wherein the first communication parameter comprises a first maximum SR transmission value, and the second communication parameter comprises a second maximum SR transmission value. For example, 1108 may be performed by an output component 1244. For example, the UE may maintain an SR counter, and may increment the SR counter every time it transmits an SR. In this example, the UE may continue to transmit SRs so long as the SR counter is less than the sr-TransMax value. If the SR counter is equal to the sr-TransMax value, then the UE may refrain from transmitting another SR. If the UE receives an uplink grant in response to an SR, then the UE may reset the counter or decrement the counter by the number of SRs transmitted requesting the uplink grant.

At 1120, the UE may optionally increment the SR counter value in response to outputting the first SR for transmission. For example, 1120 may be performed by an incrementing component 1250. For example, the UE may increment the SR counter as part of the SR process when it transmits the first SR to the network node.

At 1122, the UE may optionally initiate an SR process that prepares an SR for transmission using the first communication parameter. For example, 1122 may be performed by a preparing component 1252. In certain aspects, the UE may be configured an SR process (e.g., the SR process described in FIG. 7) by which it prepares an SR for transmission to the base station.

At 1124, the UE may optionally pause the SR process during the switch. For example, 1124 may be performed by a pausing component 1254. For example, the UE may pause an ongoing SR process, then resume the process after the base station has switched to a new ES mode.

At 1110, the UE may optionally output, for transmission after the switch, a second SR to the network node, wherein outputting the second SR for transmission is based on the incremented SR counter value being less than the first maximum SR transmission value. For example, 1110 may be performed by the output component 1244. Here, the UE may continue to increment the SR counter and compare it against the sr-TransMax associated with the ES mode at which the SR process started. For example, if there is a pending SR request at the base station during the ES mode change, and the UE determines to send another SR to the base station, then the UE may continue to use the same sr-TransMax associated with the first SR even after the change.

In certain aspects, the UE may optionally output, for transmission after the switch, a second SR to the network node, wherein outputting the second SR for transmission is based on the incremented SR counter value being less than the second maximum SR transmission value. For example, if there is a pending SR request at the base station during the ES mode change, and the UE determines to send another SR to the base station, then the UE may use the sr-TransMax for the SR process, wherein the sr-TransMax is associated with the new ES mode after the change.

In certain aspects, the UE may optionally reset the SR counter value and output, for transmission after the switch, a second SR to the network node, wherein outputting the second SR for transmission is based on the reset of the SR counter, the reset SR counter value being less than the second maximum SR transmission value. For example, upon an ES mode change, the UE may reset the SR counter value for SR processes, providing the UE with a blank slate and allowing the UE to transmit an SR using parameters associated with the new ES mode.

In certain aspects, the UE may optionally output, for transmission after the switch, the SR using the first communication parameter, the SR prepared after resuming the SR process after the switch, wherein the switch is configured to terminate a first SR process performed by the apparatus during the switch, the first SR process configured to prepare a first SR for transmission using the first communication parameter. In some examples, during the switching between different ES modes at the base station, the UE may stop the SR process and restart it once the base station has moved to the new ES mode. The SR process may be restarted by with an initial access process or new SR process using parameters associated with the new ES mode.

At 1112, the UE may output, for transmission after the switch, the SR using the first communication parameter, the SR prepared after resuming the SR process after the switch, wherein the switch is configured to pause an SR process performed by the apparatus during the switch, the SR process configured to initiate an SR process that prepares an SR for transmission using the first communication parameter. For example, 1112 may be performed by output component 1244. In some examples, during the switching between different ES modes at the base station, the UE may pause a current SR process and resume the process once the base station has moved to the new ES mode. Thus, in certain aspects, the UE may prepare an SR for transmission using the first communication parameter, pause the SR process during the switch, resume the SR process after the switch, and output, for transmission after the switch, the SR using the first communication parameter after the switch.

At 1114, the UE switch from the first BWP to the second BWP in response to the indication of the change, wherein the switch occurs after a defined amount of time, wherein the first communication parameter is a first BWP, and the second communication parameter is a second BWP mapped to the second ES mode and a third ES mode. For example, 1114 may be performed by a switching component 1246. For example, an ES mode change at the base station may trigger the UE to change from a first BWP to a second BWP, wherein the second BWP is associated with the new ES mode.

At 1116, the UE switch from the second BWP to a third BWP in order to perform an initial access process with the network node, wherein the third BWP is an initial access BWP. For example, 902 may be performed by the switching component 1246. Here, if the UE switches to the new BWP because of the ES mode change, but the UE has to perform random access and the new BWP is not an initial access BWP, then the UE may fall back to an initial access BWP to perform random access.

In certain aspects, the ES configuration comprises an indication of the amount of time.

In certain aspects, an SR counter value prior to the switch is maintained after the switch.

In certain aspects, the one or more communication parameters comprises one or more bandwidth parts (BWPs), and wherein the ES configuration comprises at least one of: an indication of one or more ES modes of the plurality of ES modes corresponding to each of the one or more BWPs, or an identifier of the one or more BWPs associated with each of the one or more ES modes.

In certain aspects, the first communication parameter is a first BWP, and the second communication parameter is a second BWP mapped to the second ES mode and a third ES mode.

In certain aspects, the third BWP maps to each of the plurality of ES modes or to a subset of the plurality of ES modes.

In certain aspects, the ES configuration is obtained via a radio resource control (RRC) message.

At 1118, the UE may communicate with the network node using the second communication parameter. For example, 902 may be performed by a communication component 1248.

Figure 12:
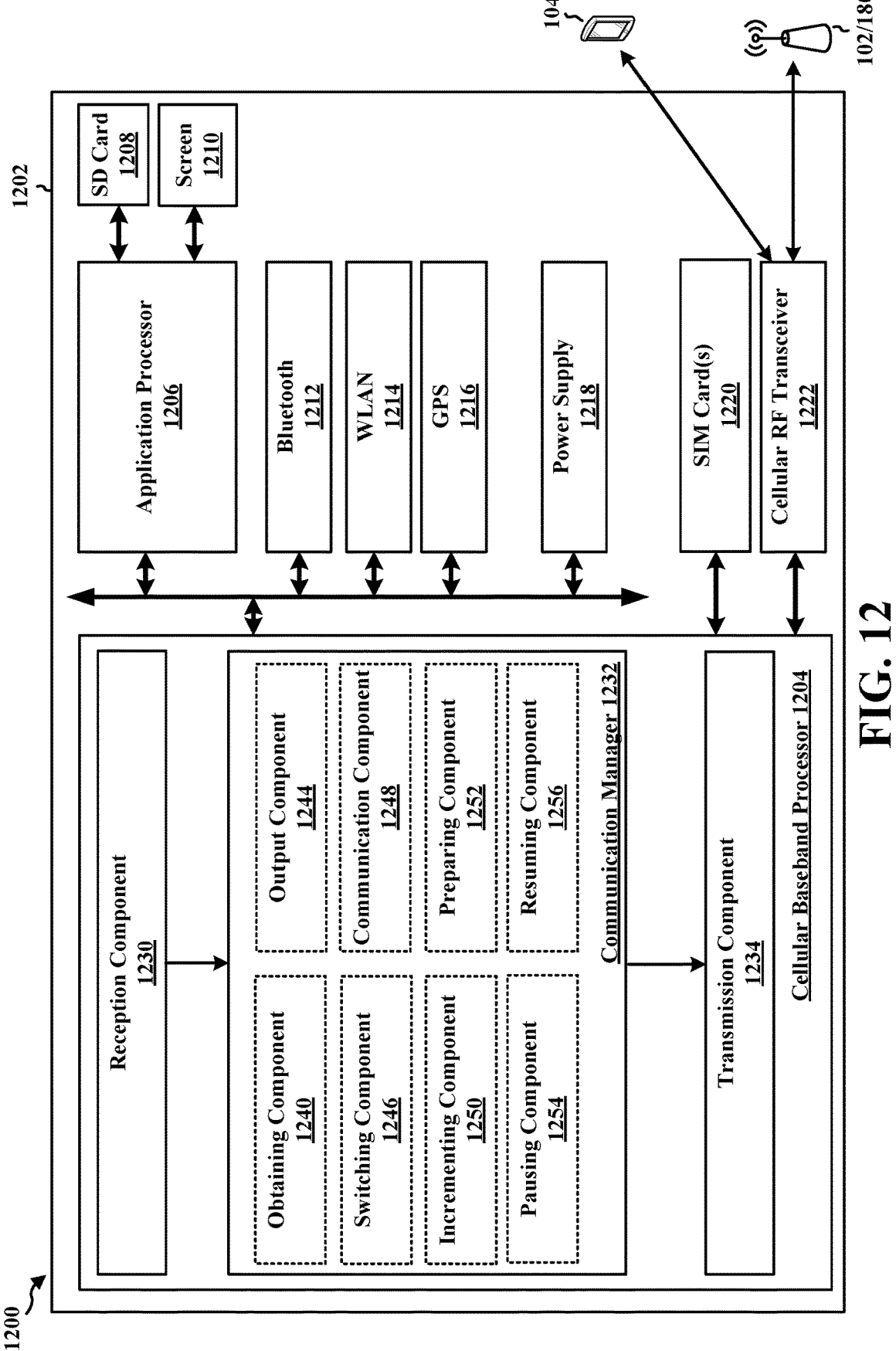
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see UE 350 of FIG. 3) and include the aforediscussed additional modules of the apparatus 1202.

The communication manager 1232 includes an obtaining component 1240 that is configured to obtain, from a network node, an energy saving (ES) configuration providing a plurality of ES modes initiated by the network node, wherein each of the plurality of ES modes is mapped to a corresponding one or more communication parameters, and wherein the plurality of ES modes comprises a first ES mode and a second ES mode; obtain, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; e.g., as described in connection with 1102 and 1104 of FIG. 11.

The communication manager 1232 further includes a switching component 1246 that is configured to switch from the first communication parameter to the second communication parameter in response to the indication of the change; switch from the first BWP to the second BWP in response to the indication of the change, wherein the switch occurs after a defined amount of time; switch from the second BWP to a third BWP in order to perform an initial access process with the network node, wherein the third BWP is an initial access BWP; e.g., as described in connection with 1106, 1114, and 1116 of FIG. 11.

The communication manager 1232 further includes an output component 1244 that is configured to output, for transmission prior to the switch, a first SR to the network node, wherein outputting the first SR for transmission is based on an SR counter value being less than the first maximum SR transmission value; output, for transmission after the switch, a second SR to the network node, wherein outputting the second SR for transmission is based on the incremented SR counter value being less than the first maximum SR transmission value; output, for transmission after the switch, a second SR to the network node, wherein outputting the second SR for transmission is based on the incremented SR counter value being less than the second maximum SR transmission value; reset the SR counter value; output, for transmission after the switch, a second SR to the network node, wherein outputting the second SR for transmission is based on the reset of the SR counter, the reset SR counter value being less than the second maximum SR transmission value; output, for transmission after the switch, a second SR using the second communication parameter, the second SR prepared for transmission by a second SR process performed after the switch; output, for transmission after the switch, the SR using the first communication parameter, the SR prepared after resuming the SR process after the switch; e.g., as described in connection with 1108, 1110, and 1112 of FIG. 11.

The communication manager 1232 further includes an output component 1248 that is configured to communicate with the network node using the second communication parameter; e.g., as described in connection with 1118 of FIG. 11.

The communication manager 1232 further includes an incrementing component 1250 that is configured to increment the SR counter value in response to outputting the first SR for transmission; e.g., as described in connection with 1120 of FIG. 11.

The communication manager 1232 further includes a preparing component 1252 that is configured to initiate an SR process that prepares an SR for transmission using the first communication parameter; e.g., as described in 1122 of FIG. 11.

The communication manager 1232 further includes a preparing component 1254 that is configured to pause the SR process during the switch; e.g., as described in 1124 of FIG. 11.

The communication manager 1232 further includes a resuming component 1256 that is configured to resume the SR process after the switch (e.g., after base station switches its ES).

The apparatus may include additional components that perform each of the blocks of the algorithm in the aforementioned flowchart of FIG. 11. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for obtaining, from a network node, an energy saving (ES) configuration providing a plurality of ES modes initiated by the network node, wherein each of the plurality of ES modes is mapped to a corresponding one or more communication parameters, and wherein the plurality of ES modes comprises a first ES mode and a second ES mode; means for obtaining, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; means for switching from the first communication parameter to the second communication parameter in response to the indication of the change; means for outputting, for transmission prior to the switch, a first SR to the network node, wherein outputting the first SR for transmission is based on an SR counter value being less than the first maximum SR transmission value; means for incrementing the SR counter value in response to outputting the first SR for transmission; means for outputting, for transmission after the switch, a second SR to the network node, wherein outputting the second SR for transmission is based on the incremented SR counter value being less than the first maximum SR transmission value; means for initiating an SR process that prepares an SR for transmission using the first communication parameter; means for pausing the SR process during the switch; means for resuming the SR process after the switch; means for outputting, for transmission after the switch, the SR using the first communication parameter, the SR prepared after resuming the SR process after the switch; means for switching from the first BWP to the second BWP in response to the indication of the change, wherein the switch occurs after a defined amount of time; means for switching from the second BWP to a third BWP in order to perform an initial access process with the network node, wherein the third BWP is an initial access BWP; means for communicate with the network node using the second communication parameter; means for incrementing the SR counter value in response to outputting the first SR for transmission; means for pausing the SR process during the switch; means for resuming the SR process after the switch; means for outputting, for transmission after the switch, a second SR to the network node, wherein outputting the second SR for transmission is based on the incremented SR counter value being less than the second maximum SR transmission value; means for outputting, for transmission after the switch, a second SR to the network node, wherein outputting the second SR for transmission is based on the reset of the SR counter, the reset SR counter value being less than the second maximum SR transmission value; means for output, for transmission after the switch, a second SR using the second communication parameter, the second SR prepared for transmission by a second SR process performed after the switch.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 13 is a flowchart 1300 of a method of wireless communication. The method may be performed by a base station or network node (e.g., the base station 102 of FIG. 1; base station 426 of FIG. 4; base station 500 of FIG. 5; the apparatus 1402).

At 1302, the base station may output, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprises a first ES mode and a second ES mode. For example, 1302 may be performed by an output component 1440.

At 1304, the base station may output, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters. For example, 1304 may be performed by an output component 1440.

At 1306, the base station may optionally switch from the first ES mode to the second ES mode. For example, 1306 may be performed by a switching component 1442.

At 1308, the base station may optionally obtain, from the UE after the switch, an SR configured according to one of the first maximum SR transmission value or the second maximum SR transmission value. For example, 1308 may be performed by an obtaining component 1444.

At 1310, the base station may switch from the first BWP to the second BWP after a defined amount of time following the output for transmission of the indication of the change. For example, 1310 may be performed by the switching component 1442.

At 1312, the base station may communicate with the UE according to the second communication parameter. For example, 1312 may be performed by a communication component 1446.

At 1314, the base station may communicate with the UE according to the second BWP after the switch. For example, 1314 may be performed by the communication component 1446.

In certain aspects, the one or more communication parameters comprises at least one of a scheduling request (SR) timer value or a maximum SR transmission value.

In certain aspects, the first communication parameter comprises a first maximum scheduling request (SR) transmission value, and the second communication parameter comprises a second maximum SR transmission value.

In certain aspects, the one or more communication parameters comprises one or more bandwidth parts (BWPs), and wherein the ES configuration comprises at least one of: an indication of one or more ES modes of the plurality of ES modes corresponding to each of the one or more BWPs, or an identifier of the one or more BWPs associated with each of the one or more ES modes.

In certain aspects, the first communication parameter is a first bandwidth part (BWP), and the second communication parameter is a second BWP mapped to the second ES mode and a third ES mode.

In certain aspects, the ES configuration comprises an indication of the amount of time.

In certain aspects, the ES configuration is output for transmission via a radio resource control (RRC) message.

Figure 14:
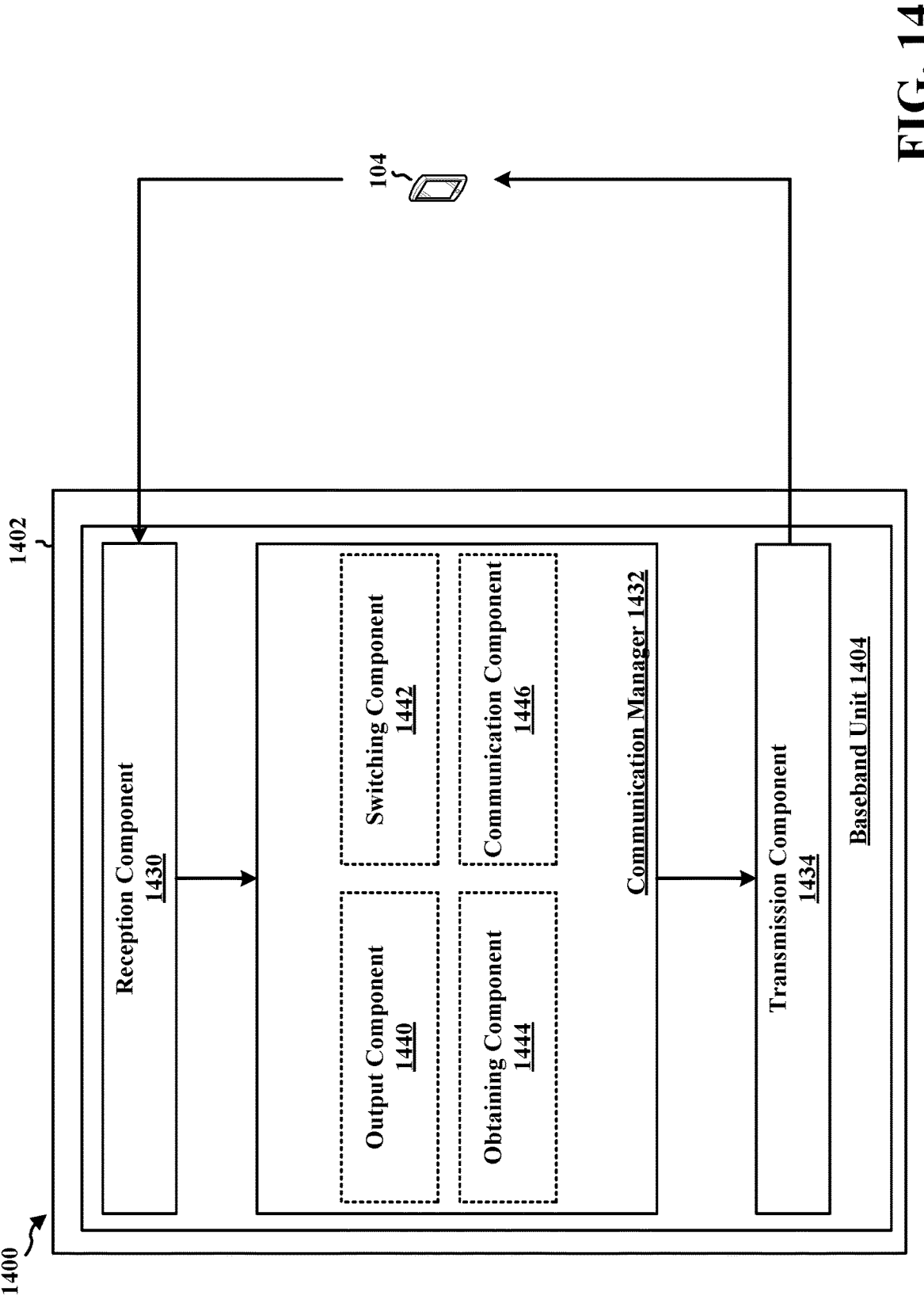
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 102 and may include the memory 376 and/or at least one of the TX processor 316, the RX processor 370, and the controller/processor 375.

The communication manager 1432 includes an output component 1440 configured to output, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprises a first ES mode and a second ES mode; output, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; e.g., as described in connection with 1302 and 1304 of FIG. 13.

The communication manager 1432 includes a switching component 1442 configured to switch from the first ES mode to the second ES mode; and switch from the first BWP to the second BWP after a defined amount of time following the output for transmission of the indication of the change; e.g., as described in connection with 1306 and 1310 of FIG. 11.

The communication manager 1432 includes an obtaining component 1444 configured to obtain, from the UE after the switch, an SR configured according to one of the first maximum SR transmission value or the second maximum SR transmission value, e.g., as described in connection with 1308 of FIG. 11.

The communication manager 1432 includes a communication component 1446 configured to communicate with the UE according to the second communication parameter; communicate with the UE according to the second BWP after the switch; e.g., as described in connection with 1312 and 1314 of FIG. 13.

The apparatus may include additional components that perform each of the blocks of the algorithm in the aforementioned flowchart of FIG. 13. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for outputting, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprises a first ES mode and a second ES mode; means for outputting, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; means for switching from the first ES mode to the second ES mode; means for obtaining, from the UE after the switch, an SR configured according to one of the first maximum SR transmission value or the second maximum SR transmission value; means for switching from the first BWP to the second BWP after a defined amount of time following the output for transmission of the indication of the change; means for communicating with the UE according to the second communication parameter; means for communicating with the UE according to the second BWP after the switch.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

EXAMPLE ASPECTS

Example 1 is a method for wireless communications at an apparatus, comprising: obtaining, from a network node, an energy saving (ES) configuration providing a plurality of ES modes initiated by the network node, wherein each of the plurality of ES modes is mapped to a corresponding one or more communication parameters, and wherein the plurality of ES modes comprise a first ES mode and a second ES mode; obtaining, from the network node, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; and communicating with the network node using the second communication parameter.

Example 2 is the method of example 1, wherein the one or more communication parameters comprise at least one of a scheduling request (SR) timer value or a maximum SR transmission value.

Example 3 is the method of any of examples 1 or 2, further comprising: switching from the first communication parameter to the second communication parameter in response to the indication of the change.

Example 4 is the method of any of examples 1-3, wherein: the first communication parameter comprises a first maximum scheduling request (SR) transmission value, and the second communication parameter comprises a second maximum SR transmission value, and the method further comprises: outputting, for transmission prior to the switch, a first SR to the network node, wherein outputting the first SR for transmission is based on an SR counter value being less than the first maximum SR transmission value; and incrementing the SR counter value in response to outputting the first SR for transmission.

Example 5 is the method of any of examples 1-4, further comprising: outputting, for transmission after the switch, a second SR to the network node, wherein outputting the second SR for transmission is based on the incremented SR counter value being less than the first maximum SR transmission value.

Example 6 is the method of any of examples 1-4, further comprising: outputting, for transmission after the switch, a second SR to the network node, wherein outputting the second SR for transmission is based on the incremented SR counter value being less than the second maximum SR transmission value.

Example 7 is the method of any of examples 1-4, further comprising: resetting the SR counter value; and outputting, for transmission after the switch, a second SR to the network node, wherein outputting the second SR for transmission is based on the reset of the SR counter, the reset SR counter value being less than the second maximum SR transmission value.

Example 8 is the method of any of examples 1-3, wherein: the switch is configured to terminate a first SR process performed by the apparatus during the switch, the first SR process configured to prepare a first SR for transmission using the first communication parameter, and further comprising: outputting, for transmission after the switch, a second SR using the second communication parameter, the second SR prepared for transmission by a second SR process performed after the switch.

Example 9 is the method of example 8, wherein an SR counter value is reset in response to the termination of the first SR process.

Example 10 is the method of any of examples 1-3, further comprising: initiating an SR process that prepares an SR for transmission using the first communication parameter; pausing the SR process during the switch; resuming the SR process after the switch; and outputting, for transmission after the switch, the SR using the first communication parameter, the SR prepared after resuming the SR process after the switch.

Example 11 is the method of example 10, wherein an SR counter value prior to the switch is maintained after the switch.

Example 12 is the method of any of examples 1-3, wherein the one or more communication parameters comprise one or more bandwidth parts (BWPs), and wherein the ES configuration comprises at least one of: an indication of one or more ES modes of the plurality of ES modes corresponding to each of the one or more BWPs, or an identifier of the one or more BWPs associated with each of the one or more ES modes.

Example 13 is the method of any of examples 1-3, wherein: the first communication parameter is a first BWP, and the second communication parameter is a second BWP mapped to the second ES mode and a third ES mode.

Example 14 is the method of example 13, further comprising: switching from the first BWP to the second BWP in response to the indication of the change, wherein the switch occurs after a defined amount of time.

Example 15 is the method of any of examples 1-3 and 14, wherein the ES configuration comprises an indication of the amount of time.

Example 16 is the method of any of examples 1-3 and 13, wherein the plurality of ES modes further comprise a third ES mode mapped to a corresponding third BWP, wherein the method further comprises: switching from the second BWP to a third BWP in order to perform an initial access process with the network node, wherein the third BWP is an initial access BWP.

Example 17 is the method of any of examples 1-3 and 16, wherein the third BWP maps to each of the plurality of ES modes or to a subset of the plurality of ES modes.

Example 18 is the method of any of examples 1-3, wherein the ES configuration is obtained via a radio resource control (RRC) message.

Example 19 is a method for wireless communications at an apparatus, comprising: outputting, for transmission to a user equipment (UE), an energy saving (ES) configuration providing a plurality of ES modes initiated by the apparatus, wherein each of the plurality of ES modes is mapped to a corresponding one or more communication parameters, and wherein the plurality of ES modes comprise a first ES mode and a second ES mode; outputting, for transmission to the UE, an indication of a change from the first ES mode to the second ES mode, wherein the first ES mode is mapped to a corresponding first communication parameter of the one or more communication parameters, and the second ES mode is mapped to a corresponding second communication parameter of the one or more communication parameters; and communicating with the UE according to the second communication parameter.

Example 20 is the method of example 19, wherein the one or more communication parameters comprise at least one of a scheduling request (SR) timer value or a maximum SR transmission value.

Example 21 is the method of any of examples 19-20, wherein the first communication parameter comprises a first maximum scheduling request (SR) transmission value, and the second communication parameter comprises a second maximum SR transmission value.

Example 22 is the method of any of examples 19-21, further comprising: switching from the first ES mode to the second ES mode; and obtaining, from the UE after the switch, an SR configured according to one of the first maximum SR transmission value or the second maximum SR transmission value.

Example 23 is the method of any of examples 19-22, wherein the one or more communication parameters comprise one or more bandwidth parts (BWPs), and wherein the ES configuration comprises at least one of: an indication of one or more ES modes of the plurality of ES modes corresponding to each of the one or more BWPs, or an identifier of the one or more BWPs associated with each of the one or more ES modes.

Example 24 is the method of any of examples 19-23, wherein: the first communication parameter is a first bandwidth part (BWP), and the second communication parameter is a second BWP mapped to the second ES mode and a third ES mode.

Example 25 is the method of any of examples 19-24, further comprising: switching from the first BWP to the second BWP after a defined amount of time following the output for transmission of the indication of the change; and communicating with the UE according to the second BWP after the switch.

Example 26 is the method of any of examples 19-25, wherein the ES configuration comprises an indication of the amount of time and wherein the ES configuration is output for transmission via a radio resource control (RRC) message.

Example 27 is a UE, comprising: a transceiver; a memory comprising instructions; and one or more processors configured to execute the instructions to cause the UE to perform a method in accordance with any one of examples 1-18, wherein the transceiver is configured to: receive, from the network node, the ES configuration; and receive, from the network node, the indication of the change from the first ES mode to the second ES mode.

Example 28 is a network node, comprising: a transceiver; a memory comprising instructions; and one or more processors configured to execute the instructions and cause the network node to perform a method in accordance with any one of examples 19-26, wherein the transceiver is configured to: transmit the ES configuration; and transmit the indication of the change.

Example 29 is an apparatus for wireless communications, comprising means for performing a method in accordance with any one of examples 1-18.

Example 30 is an apparatus for wireless communications, comprising means for performing a method in accordance with any one of examples 19-26.

Example 31 is a non-transitory computer-readable medium comprising instructions that, when executed by an apparatus, cause the apparatus to perform a method in accordance with any one of examples 1-18.

Example 32 is a non-transitory computer-readable medium comprising instructions that, when executed by an apparatus, cause the apparatus to perform a method in accordance with any one of examples 19-26.

Example 33 is an apparatus for wireless communications, comprising: a memory comprising instructions; and one or more processors configured to execute the instructions to cause the apparatus to perform a method in accordance with any one of examples 1-18.

Example 34 is apparatus for wireless communications, comprising: a memory comprising instructions; and one or more processors configured to execute the instructions to cause the apparatus to perform a method in accordance with any one of examples 19-26.

What is claimed is:

1. An apparatus for wireless communications, comprising:
   a memory comprising instructions; and
   one or more processors configured to execute the instructions and cause the apparatus to:
      obtain, from a network node, an energy saving(ES) configuration providing a plurality of ES modes initiated by the network node, wherein each of the plurality of ES modes is associated with a corresponding one or more communication parameters comprising at least a scheduling request (SR) timer value and a maximum SR transmission value, and wherein the plurality of ES modes comprise a first ES mode and a second ES mode;
      obtain, from the network node, an indication of a change from the first ES mode to the second ES mode, wherein the first ES mode is associated with a corresponding first communication parameter of the one or more communication parameters, and the second ES mode is associated with a corresponding second communication parameter of the one or more communication parameters; and
      communicate with the network node using the second communication parameter.

2. The apparatus of claim 1, wherein the apparatus is further configured to:
   switch from the first communication parameter to the second communication parameter in response to the indication of the change.

3. The apparatus of claim 2, wherein:
   the first communication parameter comprises a first maximum scheduling request (SR) transmission value, and the second communication parameter comprises a second maximum SR transmission value, and
   the apparatus is further configured to:
      output, for transmission prior to the switch, a first SR to the network node, wherein outputting the first SR for transmission is based on an SR counter value being less than the first maximum SR transmission value; and
      increment the SR counter value in response to outputting the first SR for transmission.

4. The apparatus of claim 3, wherein the apparatus is further configured to:
   output, for transmission after the switch, a second SR to the network node, wherein outputting the second SR for transmission is based on the incremented SR counter value being less than the first maximum SR transmission value.

5. The apparatus of claim 3, wherein the apparatus is further configured to:
   output, for transmission after the switch, a second SR to the network node, wherein outputting the second SR for transmission is based on the incremented SR counter value being less than the second maximum SR transmission value.

6. The apparatus of claim 3, wherein the apparatus is further configured to:
   reset the SR counter value; and
   output, for transmission after the switch, a second SR to the network node, wherein outputting the second SR for transmission is based on the reset of the SR counter, the reset SR counter value being less than the second maximum SR transmission value.

7. The apparatus of claim 2, wherein the apparatus is further configured to:
   terminate a first SR process during the switch, the first SR process configured to prepare a first SR for transmission using the first communication parameter; and
   output, for transmission after the switch, a second SR using the second communication parameter, the second SR prepared for transmission by a second SR process performed after the switch.

8. The apparatus of claim 7, wherein an SR counter value is reset in response to the termination of the first SR process.

9. The apparatus of claim 2, wherein the apparatus is further configured to:
   initiate an SR process that prepares an SR for transmission using the first communication parameter;
   pause the SR process during the switch;
   resume the SR process after the switch; and
   output, for transmission after the switch, the SR using the first communication parameter, the SR prepared after resuming the SR process after the switch.

10. The apparatus of claim 9, wherein an SR counter value prior to the switch is maintained after the switch.

11. The apparatus of claim 1, wherein the one or more communication parameters comprise one or more bandwidth parts (BWPs), and wherein the ES configuration comprises at least one of:
    an indication of one or more ES modes of the plurality of ES modes corresponding to each of the one or more BWPs, or
    an identifier of the one or more BWPs associated with each of the one or more ES modes.

12. The apparatus of claim 1, wherein:
    the first communication parameter is a first bandwidth part (BWP), and
    the second communication parameter is a second BWP associated with the second ES mode and a third ES mode.

13. The apparatus of claim 12, wherein the apparatus is further configured to:
    switch from the first BWP to the second BWP in response to the indication of the change, wherein the switch occurs after a defined amount of time.

14. The apparatus of claim 13, wherein the ES configuration comprises an indication of the amount of time.

15. The apparatus of claim 12, wherein the plurality of ES modes further comprise a third ES mode associated with a corresponding third BWP, wherein the apparatus is further configured to:

switch from the second BWP to a third BWP in order to perform an initial access process with the network node, wherein the third BWP is an initial access BWP.

16. The apparatus of claim 15, wherein the third BWP is associated with each of the plurality of ES modes or to a subset of the plurality of ES modes.

17. The apparatus of claim 1, wherein the ES configuration is obtained via a radio resource control (RRC) message.

18. The apparatus of claim 1, further comprising a transceiver configured to:

receive, from the network node, the ES configuration; and receive, from the network node, the indication of the change from the first ES mode to the second ES mode, wherein the apparatus is configured as a user equipment (UE).

19. An apparatus for wireless communications, comprising:

a memory comprising instructions; and one or more processors configured to execute the instructions and cause the apparatus to:

output, for transmission to a user equipment (UE), an energy saving(ES) configuration providing a plurality of ES modes initiated by the apparatus, wherein each of the plurality of ES modes is associated with a corresponding one or more communication parameters comprising at least a scheduling request (SR) timer value and a maximum SR transmission value, and wherein the plurality of ES modes comprise a first ES mode and a second ES mode;

output, for transmission to the UE, an indication of a change from the first ES mode to the second ES mode, wherein the first ES mode is mapped to associated with a corresponding first communication parameter of the one or more communication parameters, and the second ES mode is associated with a corresponding second communication parameter of the one or more communication parameters; and communicate with the UE according to the second communication parameter.

20. The apparatus of claim 19, wherein the first communication parameter comprises a first maximum scheduling request (SR) transmission value, and the second communication parameter comprises a second maximum SR transmission value.

21. The apparatus of claim 20, wherein the apparatus is further configured to:

switch from the first ES mode to the second ES mode; and obtain, from the UE after the switch, an SR configured according to one of the first maximum SR transmission value or the second maximum SR transmission value.

22. The apparatus of claim 19, wherein the one or more communication parameters comprise one or more bandwidth parts (BWPs), and wherein the ES configuration comprises at least one of:

an indication of one or more ES modes of the plurality of ES modes corresponding to each of the one or more BWPs, or an identifier of the one or more BWPs associated with each of the one or more ES modes.

23. The apparatus of claim 19, wherein:

the first communication parameter is a first bandwidth part (BWP), and the second communication parameter is a second BWP associated with the second ES mode and a third ES mode.

24. The apparatus of claim 23, wherein the apparatus is further configured to:

switch from the first BWP to the second BWP after a defined amount of time following the output for transmission of the indication of the change; and communicate with the UE according to the second BWP after the switch.

25. The apparatus of claim 24, wherein the ES configuration comprises an indication of the amount of time and wherein the ES configuration is output for transmission via a radio resource control (RRC) message.

26. The apparatus of claim 23, wherein the plurality of ES modes further comprise a third ES mode associated with a corresponding third BWP, wherein the apparatus is further configured to:

perform, via the third BWP, an initial access process with the UE, wherein the third BWP is an initial access BWP.

27. The apparatus of claim 19, further comprising a transceiver configured to:

transmit the ES configuration; and transmit the indication of the change, wherein the apparatus is configured as a network node.

28. A method for wireless communications at a user equipment (UE), comprising:

obtaining, from a network node, an energy saving(ES) configuration providing a plurality of ES modes initiated by the network node, wherein each of the plurality of ES modes is associated with a corresponding one or more communication parameters comprising at least a scheduling request (SR) timer value and a maximum SR transmission value, and wherein the plurality of ES modes comprise a first ES mode and a second ES mode;

obtaining, from the network node, an indication of a change from the first ES mode to the second ES mode, wherein the first ES mode is associated with a corresponding first communication parameter of the one or more communication parameters, and the second ES mode is associated with a corresponding second communication parameter of the one or more communication parameters; and communicating with the network node using the second communication parameter.

29. The method of claim 28, further comprising:

switching from the first communication parameter to the second communication parameter in response to the indication of the change.

30. The method of claim 29, wherein:

the first communication parameter comprises a first maximum scheduling request (SR) transmission value, and the second communication parameter comprises a second maximum SR transmission value, the method further comprising:

outputting, for transmission prior to the switching, a first SR to the network node, wherein outputting the first SR for transmission is based on an SR counter value being less than the first maximum SR transmission value; and incrementing the SR counter value in response to outputting the first SR for transmission.

* * * * *